(12) United States Patent
Cesarini

(10) Patent No.: US 8,712,372 B2
(45) Date of Patent: Apr. 29, 2014

(54) PRE AND POST-PAID REAL TIME BILLING CONVERGENCE SYSTEM

(75) Inventor: Andrea Cesarini, Acilia Roma (IT)

(73) Assignee: Accenture Global Services Limited, Dublin (IE)

( * ) Notice: Subject to any disclaimer, the term of this patent is extended or adjusted under 35 U.S.C. 154(b) by 1675 days.

(21) Appl. No.: 11/290,917

(22) Filed: Nov. 30, 2005

(65) Prior Publication Data

US 2007/0123212 A1 May 31, 2007

(30) Foreign Application Priority Data

Aug. 31, 2005 (EP) .................................... 05425611
Aug. 31, 2005 (IT) .............................. MI2005A1618

(51) Int. Cl.
*H04M 11/00* (2006.01)

(52) U.S. Cl.
USPC .......................................................... 455/406

(58) Field of Classification Search
USPC ..................... 455/406, 432.1, 410, 90.2, 405; 379/114.2; 705/40, 1, 39, 41, 14.53, 705/14.25, 14.1, 30, 64, 35, 14.17; 709/203
See application file for complete search history.

(56) References Cited

U.S. PATENT DOCUMENTS

| | | | |
|---|---|---|---|
| 2001/0000808 A1* | 5/2001 | Lesley | 705/39 |
| 2003/0157925 A1* | 8/2003 | Sorber et al. | 455/406 |
| 2004/0015366 A1 | 1/2004 | Wiseman et al. | |
| 2004/0132449 A1* | 7/2004 | Kowarsch | 455/432.1 |
| 2004/0153404 A1 | 8/2004 | Rischmueller et al. | |
| 2005/0100149 A1* | 5/2005 | Abbasi et al. | 379/114.2 |
| 2005/0136890 A1* | 6/2005 | Lippelt | 455/406 |
| 2005/0209957 A1* | 9/2005 | Kasiviswanathan et al. | 705/39 |

FOREIGN PATENT DOCUMENTS

| | | |
|---|---|---|
| EP | 1 052 841 A2 | 11/2000 |
| EP | 1 418 743 A1 | 5/2004 |
| WO | WO 03/025809 A2 | 3/2003 |
| WO | WO 03/069434 | 8/2003 |
| WO | WO 03/034631 | 4/2006 |

OTHER PUBLICATIONS

XP-002186388, OpenCon Systems, Inc., "White Paper on Billing for the New Public Network," pp. i-iv and 1-5.
XP-002186385, IPDR, A View into the IPDR Organizaton, "Standards Effort Moves from Usage to Provisioning", TelOSSource Magazine, Apr. 2000, 6 pages.
Examination Report in International Application No. 05 425 611.0-2414 dated Nov. 19, 2008, 6 pages.

* cited by examiner

*Primary Examiner* — Kiet Doan
(74) *Attorney, Agent, or Firm* — Brinks Gilson & Lione

(57) ABSTRACT

A telecommunications service provider architecture integrates multiple architectures which include prepaid and post-paid processing systems. The convergent enhanced architecture provides performance, scalability, and efficiency consistent with a prepaid architecture and flexibility and configurability consistent with a post-paid system. The convergent architecture provides messaging interfaces between a telecommunications support architecture and a prepaid architecture or a combined rating and billing architecture. The messaging interfaces support message transfer between the processing systems in the architectures to provide information exchange including billing exchanges, rating exchanges, and customer management exchanges.

21 Claims, 10 Drawing Sheets

PRE AND POST-PAID REAL TIME BILLING CONVERGENCE SYSTEM

PRIORITY CLAIM

This application claims the priority benefit of EPO Application NO. 05425611.0 filed Aug. 31, 2005 and Italian Application No. MI2005A001618 filed Aug. 31, 2005, both of which are incorporated herein by reference in their entirety.

BACKGROUND OF THE INVENTION

1. Technical Field

This invention relates to telecommunications processing systems. In particular, this invention relates to an efficient and flexible architecture which integrates prepaid account processing systems and post-paid account processing systems.

2. Related Art

Rapid advances in data processing and telecommunications technology have lead to a vast array of communication services available to the consumer. Such telecommunication services include Internet service, cable television service, cellular phone service, paging service, combined voice and data delivery service, and many other services. Furthermore, most services may be wireless or wireline based.

With the increase in available services has also come increased flexibility in paying for those services. Traditionally, most customer accounts were post-paid accounts. For post-paid accounts, the service provider tracked all of the time a customer spent using a service, determined the applicable cost, and billed the customer (e.g., monthly). In other words, the customer paid only after using the service.

More recently, prepaid accounts have become a viable option for paying for telecommunications services. For a prepaid account, a customer makes an initial payment to the service provider which establishes a credit balance with the service provider. The customer may then use a telecommunications service until the credit balance is exhausted, with accounting performed during or after the termination of each service use transaction.

In the past, service providers implemented processing architectures in which independent systems supported prepaid and post-paid customers and performed customer management. The post-paid systems provided support for payment collection, invoicing, billing, discount and loyalty management, as well as other post-paid support functions. The prepaid systems provided support for credit refills, usage statements, balance management, and other prepaid support functions. However, architectures with independent prepaid, post-paid, and customer management processing systems significantly increased the complexity of providing both prepaid and post-paid services, resulted in a greater number of architectural impacts when rolling out new products, and increased both operational expenditures and capital expenditures to support products and services across both types of payment plans.

In addition, the lack of interaction between systems limited the products, services, discounts, billing flexibility, incentives, rewards, and other telecommunication service aspects which the service provider could provide for its customers. For example, a post-paid account generally had no interaction with a prepaid account, even when the accounts were for a common customer. Thus, the telecommunications service provider could not readily offer cross-product discounts, incentives, or billing options.

SUMMARY

One aspect of the invention is a convergent telecommunications system architecture. The convergent architecture unites traditionally independent telecommunications architectures which perform a wide variety of functions. For example, the convergent architecture may unite a self care system, customer care system, billing system, and other support systems which exist in a telecommunications support architecture with a prepaid account balance manager and real time rating system which exist in a prepaid architecture. Efficient and flexible messaging interfaces unite the architectures. In an alternate convergent architecture, a telecommunications support architecture is integrated with a combined rating and billing architecture. As a result, the architectures may efficiently communicate data between the traditionally independent architectures and may support additional products and services and may offer enhanced billing options, such as cross product discounts.

In one implementation, the telecommunications support architecture maintains prepaid rating balances (e.g., in a billing system) and post-paid account balances for service customers. In other words, any given service customer may establish either or both types of payment plans for any one or more types of telecommunications products and services. The telecommunications support architecture may maintain create, update, and/or delete control over the balances in order to establish itself as the primary authority for maintaining the customer balance data.

The prepaid architecture tracks service usage for prepaid services. The rating system may receive telecommunication network mediation requests for service for a customer. In response, the rating system tracks usage of the prepaid service, determines the cost of the usage, and synchronizes usage data with the billing system in the telecommunications support architecture.

In one implementation, the convergent architecture connects the telecommunications support architecture and the prepaid architecture with a bi-directional messaging interface. The messaging interface establishes information flow from the telecommunications support architecture to the rating system and from the rating system to the telecommunications support architecture. The telecommunications support architecture and the rating system are thereby integrated into a single telecommunications architecture.

The messaging interface, for example, includes customer account management interface and a service usage interface. The customer account management interface defines message flows from the telecommunications support architecture to the prepaid architecture. The service usage interface defines message flows from the prepaid architecture to the telecommunications support architecture.

As one example, the customer account management interface defines a refill interface establishing a refill message which the telecommunications support architecture sends to the prepaid architecture. In response, the prepaid architecture credits a prepaid account balance as specified in the refill message. An adapter may translate the refill event message as specified by a refill message mapping into a form for refill messages supported by the prepaid architecture.

As additional examples of the customer account management interfaces, the messaging interface may include a balance adjustment interface and a subscriber account interface. The balance adjustment interface defines a balance adjustment message sent from the customer care system to the rating system. The subscriber account interface defines messages for customer and customer account creation and modification.

In addition, the messaging interface supports information flow from the rating system to the telecommunications support architecture. The information flow may be a batch file or message flow which runs on a periodic schedule, in real time, or according to any other schedule. More specifically, the messaging interface defines a service usage interface from the prepaid rating system to the telecommunications support architecture.

The service usage interface allows the rating system to communicate service usage information for prepaid service use to the telecommunications support architecture where centralized management of the customer balances occurs. To that end, the service usage interface may establish a messaging protocol which constructs messages and/or files based on a service use event record. The service use event record provides an efficient and flexible message transport mechanism which delivers a wide variety of information from the rating system to the telecommunications support architecture using a consistent message format.

The service use event record may include an event header and an event attribute list. The service usage interface may then define multiple event type definitions. Each definition may include an event attribute definition which specifies event attributes for insertion into the event attribute list in the service use event record. As examples, the event type definitions may specify rating information for services including voice traffic, short message service (SMS), Internet traffic, voice over Internet protocol service, Internet protocol television service, or any other telecommunications service.

The service use event record need not change to support additional event types. Instead, a new event type definition may be provided which fits within the service use event record. Accordingly, the telecommunications architecture efficiently and flexibly supports the integration of prepaid and post-paid processing systems over a wide range of telecommunications products and services.

Other systems, methods, features and advantages of the invention will be, or will become, apparent to one with skill in the art upon examination of the following figures and detailed description. It is intended that all such additional systems, methods, features and advantages be included within this description and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the reverse rating systems and method may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the convergent architecture will be described, methods, systems, and articles of manufacture consistent with the convergent architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Figure 1:
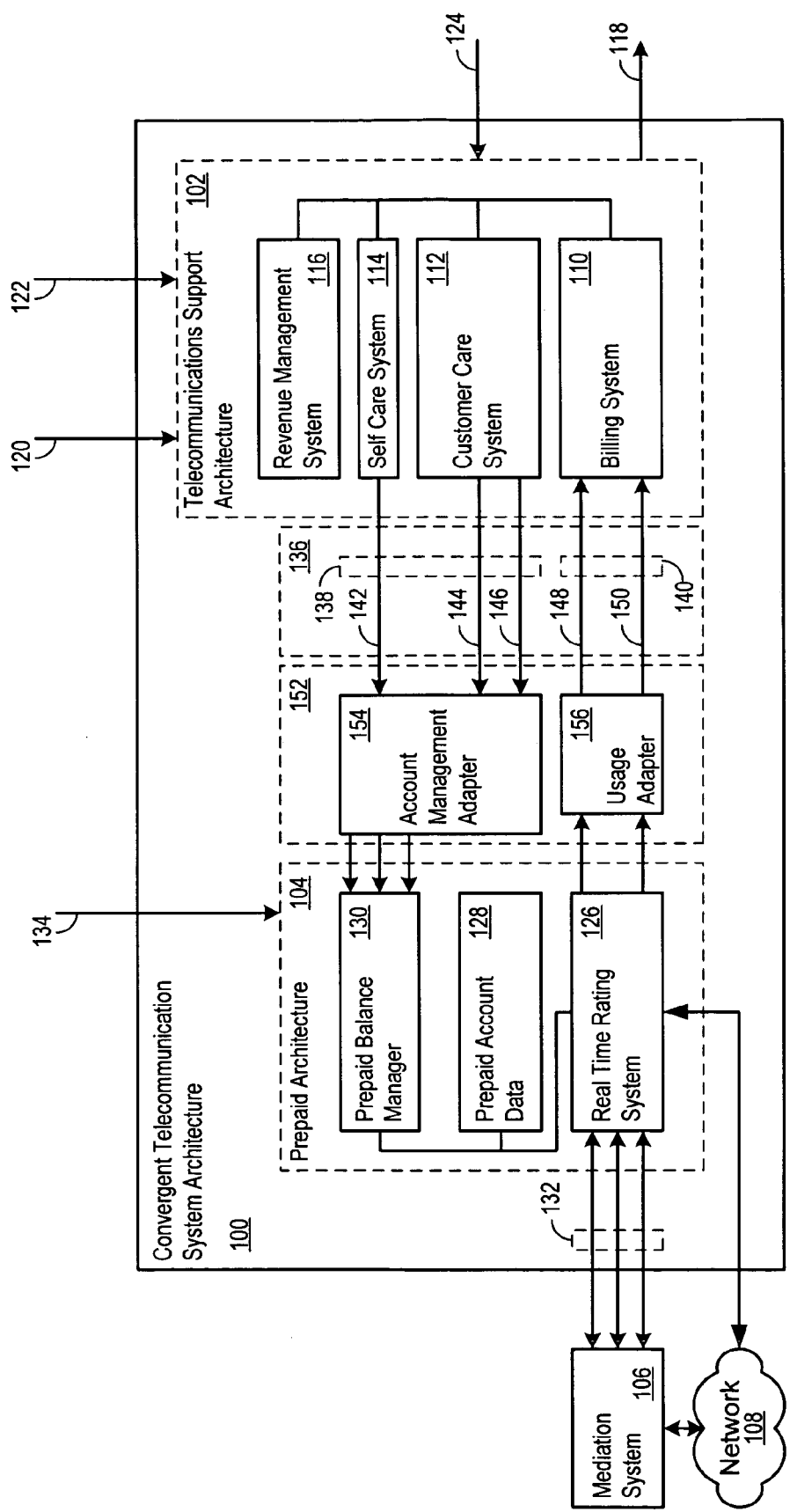
FIG. 1 shows a convergent telecommunications architecture which integrates a telecommunications support architecture and a prepaid architecture.

FIG. 1 shows a convergent telecommunications architecture 100 which integrates a telecommunications support architecture 102 and a prepaid architecture 104. The support architecture 102 generally includes systems which implement or support telecommunications products or services. The support architecture 102 may be a Business Support System (BSS) for telecommunications, including billing, customer care, and other support systems traditionally included in a BSS. It is not necessary that the support architecture 102 adhere to any traditional implementation of a BSS, however. Instead the support architecture 102 may vary widely in implementation and functionality. The prepaid architecture 104 generally includes systems which implement or support prepaid customer accounts and may be implemented as an external adjunct rating system. Each architecture 102 and 104 may vary widely in implementation and functionality, however, and examples are given below. The convergent architecture 100 interacts with a mediation system 106, which in turn communicates with the network infrastructure 108.

The convergent architecture 100 connects the support architecture 102 with the prepaid architecture 104 through messaging interfaces. FIG. 1 shows a customer account management interface 138 which supports message communication from systems in the support architecture 102 to systems in the prepaid architecture 104. In one implementation, the interface 138 includes an account refill interface 142 which communicates refill messages from the self care system 114 or customer care system 112 to the prepaid balance manager 130. The interface 138 may also include a balance adjustment interface 144 which communicates refill or other balance adjustment messages from the customer care system 112 to the prepaid balance manager 130. A subscriber account interface 146 communicates customer management messages from the customer care system 112 to the prepaid balance manager 130.

FIG. 1 also shows a service usage interface 140 which supports message communication from systems in the prepaid architecture 104 to systems in the support architecture 102. In one implementation, the interface 140 includes a detailed rated usage interface 148 which communicates detailed usage data for telecommunications products and services from the real time rating system 126 to the billing system 110. The interface 140 also includes an aggregated usage interface 150 which communicates accumulated usage data for telecommunications products and services from the real time rating system 126 to the billing system 110. The customer account management interface 138, the service usage interface 140, and the messages are described in more detail below.

The telecommunications support architecture 102 may be implemented in many different ways and may provide a wide range of functionality. As one example, FIG. 1 shows a telecommunications support architecture 102 which includes a billing system 110, a customer care system 112, a self care system 114, and a revenue management system 116. Additional or alternative functionality may be established in the telecommunications support architecture 102. The prepaid architecture 104 includes a real-time rating system 126, prepaid account data 128, and the prepaid balance manager 130. The prepaid architecture 104 thereby supports prepaid accounts, but may also include, as described below, additional or different systems, such as a billing system.

The billing system 110 generates usage statements and/or invoices 118 for the telecommunication service provider customers. In handling both prepaid and post-paid customer accounts, the billing system 110 may maintain both rating balances and account balances for the service provider customers and may exercise centralized control over the rating balances and account balances. In other words, the billing system 110 has mastership (e.g., has exclusive create, update, and delete access) of the rating balances and account balances in the architecture 100. However, in other implementations, the customer care system 112 or other system may establish mastership of the rating balances and account balances.

The rating balances are associated with services for which a customer prepays. On the other hand, account balances are generally associated with services for which a customer pay after the service is used. As will be described in more detail below, as the customer uses the prepaid service, the billing system 110 decrements the rating balance. As the customer uses the postpaid service, the billing system 110 increments the account balance. The telecommunications support architecture 102, for any given customer, may maintain and track one or more rating balances and account balances.

The self care system 114 may process prepaid account refill actions. As will be explained in more detail below, the self care system 114 may communicate refill messages to the prepaid architecture 104. The prepaid architecture 104 will accordingly update rating balance information stored locally in the prepaid architecture 104.

The revenue management system 116 may provide information which allows the communications service provider to make informed decisions concerning demand for products and services so that the communications service provider may take steps to maximize revenue. The revenue management system 116, for example, may review and analyze historical data, current demand levels, and product and service usage forecasts, and output suggested rates for the telecommunications products and services.

The telecommunications support architecture 102 receives inputs from external sources. As one example, the telecommunications support architecture 102 receives postpaid account payment messages 120. The payment messages 120 may arrive from, for example, financial institutions such as banks and may indicate payment of invoices to the telecommunications support architecture 102. In response to the payment messages 120, the telecommunications support architecture 102 may update customer account balances maintained by the billing system 110.

As another example, the telecommunications support architecture 102 may receive prepaid payment messages 122. The prepaid payment messages 122 may arrive in response to customers funding their prepaid accounts, for example by making a credit card or bank account payment. In response to the prepaid payment messages 122, the telecommunications support architecture 102 may update customer rating balances maintained by the billing system 110. Similarly, the telecommunications support architecture 102 may receive and process voucher refill actions 124. The voucher refill actions 124 may also replenish prepaid account balances. Thus, in response to a voucher refill action 124, the telecommunications support architecture may also update customer rating balances maintained by the billing system 110.

All of the functionality within the telecommunications support architecture 102 may communicate to enhance the service provided to the customer. For example, the customer care system 112 and the revenue management system 116 may communicate balance adjustment messages, dispute resolution messages, or other messages to one another. Accordingly, all of the functionality within the telecommunications support architecture 102 has access to and may report a consistent view of customer data.

In one implementation, the systems 110-116 are implemented with Accenture Communications Solutions™ components available from Accenture S.a.P of Rome, Italy. In other implementations, the Geneva™ platform available from Convergys of Chicago Ill. and/or the Siebel 7.7 CME™ platform available from Siebel Systems, Inc. of San Mateo, Calif., may implement one or more of the systems 110-116. The systems 110-116 may run under the Unix™, Windows 2000 ™, Linux™, or other operating system. Underlying databases may be implemented with an Oracle™ SQL database platform available from Oracle of Redwood Shores, Calif., Microsoft™ SQL database platform available from Microsoft Corporation of Redmond, Wash., and/or Siebel™ SQL database platform. The systems 110-116 may be implemented in other manners, however.

The telecommunications support architecture 102 connects to the prepaid architecture 104. The prepaid architecture 104 includes a real-time rating system 126, prepaid account data 128, and the prepaid balance manager 130. The prepaid architecture 104 communicates with the mediation system 106 through a messaging interface 132.

The messaging interface 132 receives messages from, and communicates messages to, the mediation system 106. For example a messaging interface 132 may receive a service use authorization request from the mediation system 106. In response, the prepaid architecture 104 may verify that the prepaid account has a balance which supports the requested service. The prepaid architecture 104 may then respond with a service use authorization or denial message to the mediation system 106. In addition, the mediation system 106 and the prepaid architecture 104 exchange messages concerning the type or amount charges to be incurred for the use of a particular product or service.

Furthermore, the mediation system 106 may provide postpaid service usage accounting messages to the prepaid architecture 104. For example, the postpaid service usage messages may report the type and duration of a postpaid telecommunications service usage, such as the duration of a cellular phone call. As will be described in more detail below, the prepaid architecture may provide postpaid service usage account messages to the telecommunications support architecture 102. The telecommunications support architecture 102 may then appropriately update postpaid account balances for the applicable customer.

The prepaid architecture 104 monitors and tracks ongoing usage of prepaid telecommunications services. To that end, the real-time rating system 126 continuously rates the ongoing service. For example, when a customer has prepaid for cellular phone service, the real-time rating system 126 monitors the duration of ongoing cellular phone calls and provides consistent cost updates to the prepaid balance manager 130. In response, the prepaid balance manager 130 continuously decrements the prepaid account balance in the prepaid account data 128. Accordingly, the prepaid balance manager 130 may determine when the prepaid customer account balance is exhausted and may then take steps to terminate the prepaid service.

Like the telecommunications support architecture 102, the prepaid architecture 104 may receive input from external sources. For example the prepaid architecture 104 may receive prepaid account refill messages 134. The refill messages 134 may arrive from many different refill channels.

As examples, point-of-sale terminals, automated teller machines, and/or interactive voice response systems may communicate refill messages directly to the prepaid architecture 104. Because the prepaid architecture 104 is integrated with the telecommunications support architecture 102 in the convergent architecture 100, the prepaid architecture 104 will communicate the refill information received in the refill messages 134 to the telecommunications support architecture 102. As noted above, the telecommunications support architecture 102 maintains centralized control over the rating balances and account balances for the telecommunications systems customers.

The prepaid architecture 104 may be implemented in many technologies. In one implementation, the Am-Beo nCharge™ and/or nRate™ platform may implement the real time rating system 126 and prepaid balance manager 130, and may maintain the prepaid account data 128. However, the prepaid architecture 104 does not maintain the prepaid account data 128 in isolation. Instead, the telecommunications support architecture 102 provides centralized management of the prepaid account data (e.g., the rating balances), as well as postpaid account data, thereby integrating the prepaid architecture 104 and the telecommunications support architecture 102 in one architecture.

The synchronization between the prepaid architecture 104 and the telecommunications support architecture 102 may be implemented by an efficient and flexible messaging interface. In particular, the architecture 100 includes a bidirectional messaging interface 136 which connects the telecommunications support architecture 102 and the prepaid architecture 104. Message flow from the telecommunications support architecture 102 to the prepaid architecture 104 may be governed by a customer account management interface 138. Similarly, message flow from the prepaid architecture 104 to the telecommunications support architecture 102 may be governed by a service usage interface 140.

The customer account management interface 138 may define interfaces, including messages and/or communication protocols, for information flow to the prepaid architecture 104. As examples, the customer account management interface 138 may define a prepaid account refill interface 142, a balance adjustment interface 144, and a subscriber account interface 146. Similarly, the service usage interface 140 may define interfaces, including messages, file structures, and/or communication protocols, for information flow from the prepaid architecture 104 to the telecommunications support architecture 102. As examples, the service usage interface 140 may establish a detailed rated usage interface 148 as well as an aggregated usage interface 150. The customer account management interface 138 and the service usage interface 140 are described in more detail below.

FIG. 1 also shows an adapter interface 152. The adapter interface may be provided between the telecommunications support architecture 102 and the prepaid architecture 104. The adapter interface 152 provides message translation, mapping, and/or transformation services which adapt messages and message content to conform to data expectations of the prepaid architecture 104 and/or telecommunications support architecture 102. In the example shown in FIG. 1, the adapter interface 152 includes account management adapters 154 and usage adapters 156.

The account management adapters 154 implement message and message content conversion from the message format in place in the telecommunications support architecture 102 to the message format in place in the prepaid architecture 104. For example, the account management adapters 154 may provide a refill message adapter which translates the refill message sent from the telecommunications support architecture 102 to a form expected by the prepaid architecture 104. Similarly, the account management adapters 154 may also provide a balance adjustment message adapter and subscriber account message adapters for customer and customer account creation and modification messages.

FIG. 1 shows that the adapter interface 152 also includes the usage adaptor 156. Like the account management adaptor 154, the usage adaptor 156 provides message and message content translation, mapping and/or transformation services for the data flowing from the prepaid architecture 104 to the telecommunications support architecture 102. The telecommunications support architecture 102 thereby receives detailed and aggregate usage data in the expected format. Alternatively, the architecture 100 may omit the adapter interface 152. In such implementations, the telecommunications support architecture 102 and/or prepaid architecture 104 prepare messages in the form expected by the receiving system, rather than in a format which is native to either system.

Figure 2:
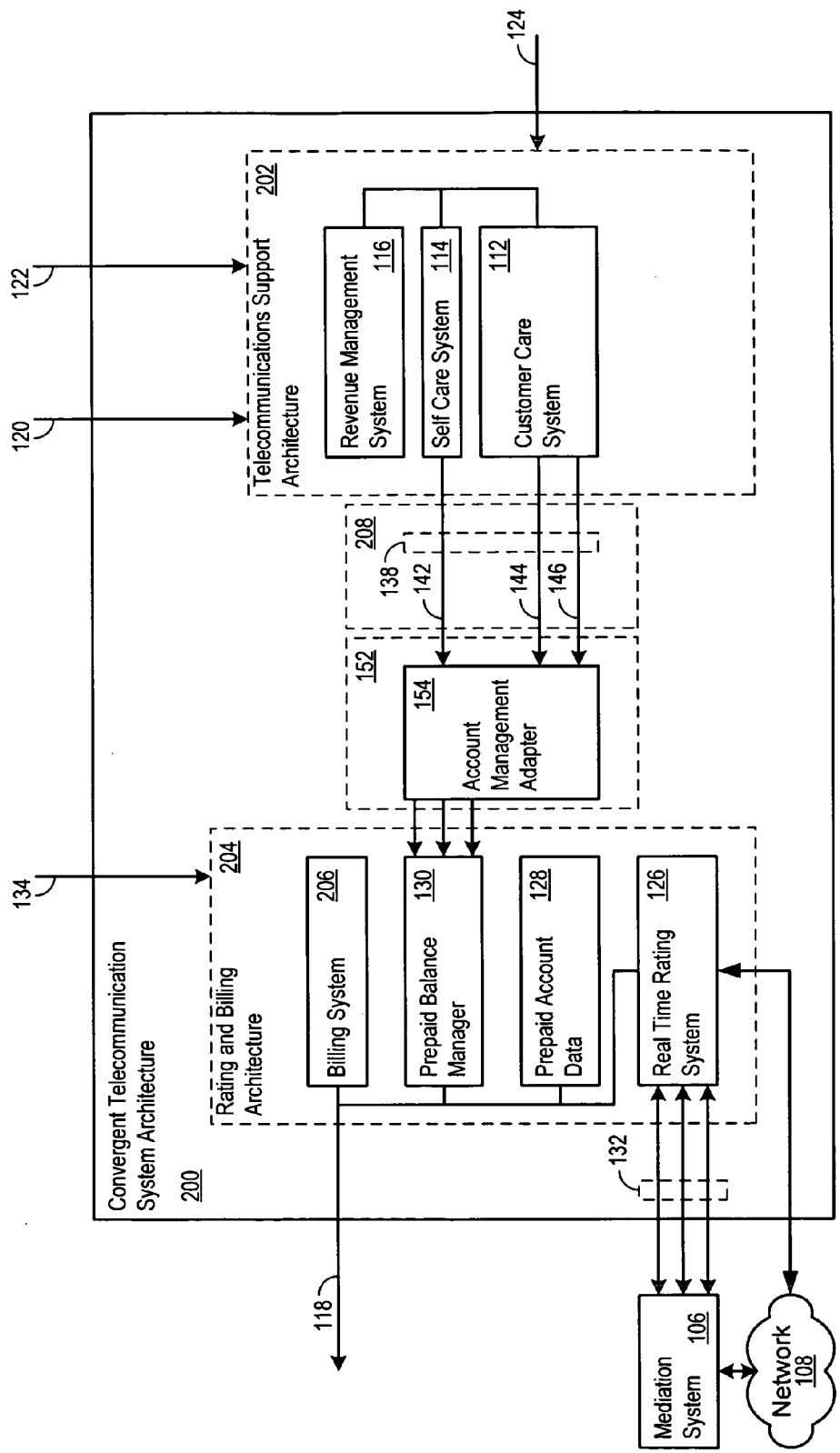
FIG. 2 shows a second implementation of a convergent telecommunications architecture which integrates a telecommunications support architecture and a combined rating and billing architecture.

FIG. 2 presents an alternate convergent telecommunications system architecture 200. The architecture 200 also integrates centralized customer account management in a telecommunications support architecture 202 with an existing rating and billing architecture 204. Thus, in the architecture 200, the telecommunications support architecture 202 does not include a billing system. Instead, the rating and billing architecture 204 implements a billing system 206.

As a result, the rating and billing architecture 204 need not report detailed or aggregate usage information back to the telecommunications support architecture 202. Instead, the rating and billing architecture 204 processes the service usage data internally and establishes and maintains the rating balances and account balances for the telecommunications system customers locally. Nevertheless, the telecommunications support architecture 202 exercises control over customer creation and modification, customer account creation and modification, as well as other aspects of customer accounts.

The telecommunications support architecture 202 and the rating and billing architecture 204 are integrated through a messaging interface 208. As described above, the messaging interface 208 establishes the customer account management interface 138. The customer account management interface 138 communicates customer and customer account creation and modification messages from the telecommunications support architecture 202 to the rating and billing architecture 204.

The architecture 200 may be implemented in many ways. For example, the account and billing system 204 may include Convergys Geneva™ platform components which implement a rating engine, a billing engine, and account management. As another example, the account and billing system 204 may include SingleView™ platform components available from Intec Telecom Systems PLC of Surrey England. The SingleView™ components may implement a commerce engine, event normalization and rating processes, a balance and reservations management system, billing and invoicing generation processes, an accounting system, or other systems.

Figure 3:
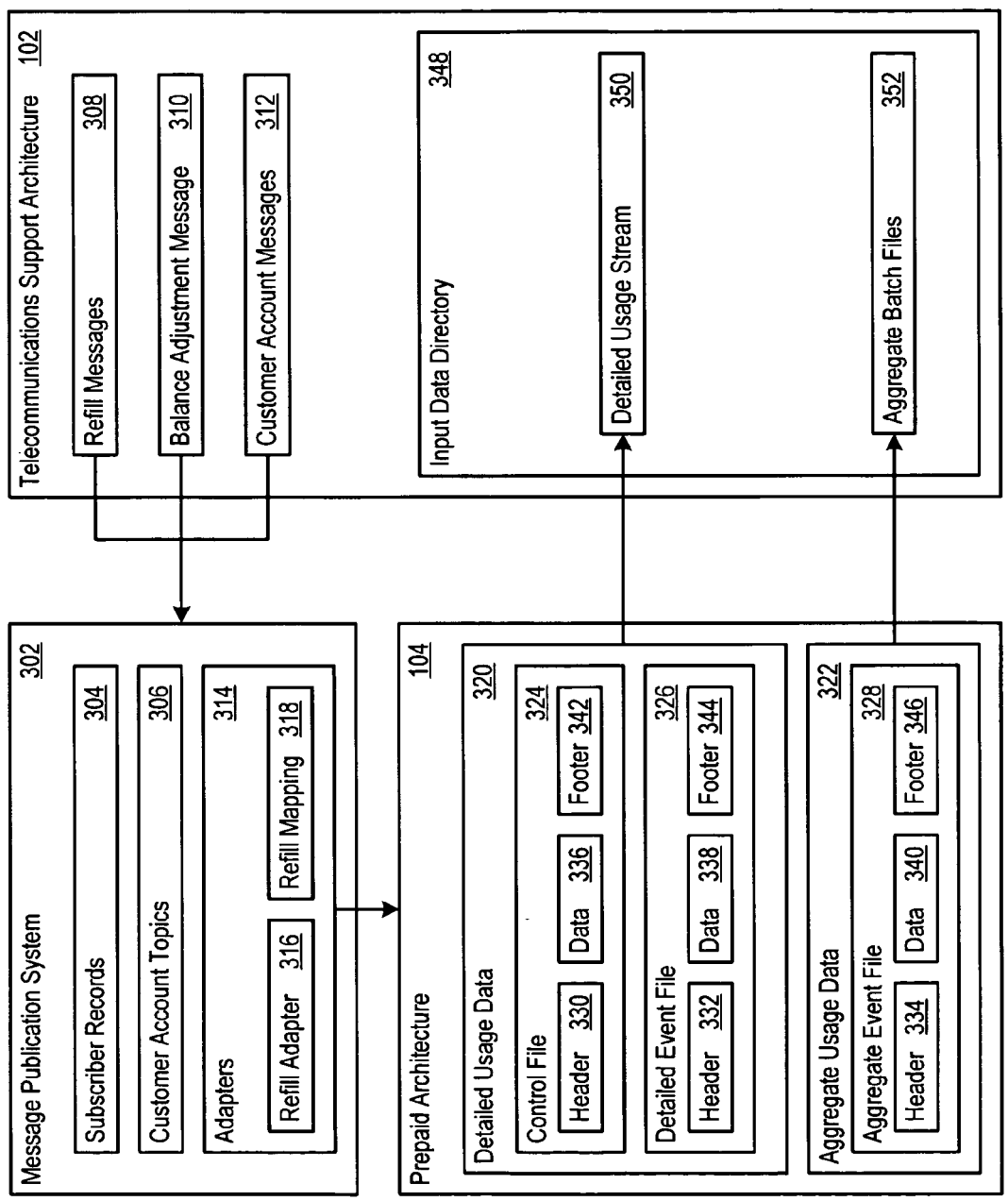
FIG. 3 shows a portion of a convergent telecommunications architecture including a customer care system, a message publication system, and a rating system.

FIG. 3 shows a portion of a convergent telecommunications architecture including the telecommunications support architecture 102, the prepaid architecture 104, and a message publication system 302 which connects the systems 102 and 104. The message publication system 302 provides an enterprise application integration (EAI) mechanism by which messages may reach the prepaid architecture 104 (and/or the rating and billing architecture 204). In particular, the message publication system 302 may implement a publish/subscribe messaging interface between the telecommunications support architecture 102 and the prepaid architecture 104.

To that end, the message publication system 302 may establish subscriber records 304 and subscriber topics 306. The message publication system 302 may then send each subscriber to a given topic a copy of each message sent to that topic when the message is received at the message publication system 302. For example, the prepaid architecture 104 may subscribe to customer account management messages, such as refill messages 308, balance adjustment messages 310, customer and customer account creation and modification messages 312, and other messages. As the message publication system 302 receives such messages from the telecommunications support architecture 102, the message publication system 302 provides a copy of each message to the prepaid architecture 104.

The message publication system 302 may also provide one or more adapters 314 in the adapter interface 152. FIG. 3 shows a refill adapter 316 which performs data translation, mapping, and transformation in accordance with a refill mapping 318. Adapters may also be provided for balance adjustment messages, customer management messages, or any other messages.

The refill adapter 316 performs message and message data translation, mapping, and transformation from the refill messages 308 to a format expected by a subscriber, such as the prepaid architecture 104. The refill mapping 318 specifies the message and message data translations, mappings, and transformations which produce a refill message for processing by the prepaid architecture 104 starting with the known format of the refill messages 308. In other words, the adapter mappings support transformation of messages and/or message content from a format defined by one schema (e.g., a schema for messages to adhere to in the telecommunications support architecture 102) to another format defined by another schema (e.g., a schema for messages to adhere to in the prepaid architecture 104 and/or the account and billing system 204).

The message publication system 302 and adapter interfaces 152 may be implemented, for example, with TIBCO Adapters$^{SM}$ and TIBCO Rendezvous™ messaging, available from TIBCO Software Inc. of Palo Alto, Calif. In one implementation, the messages communicated are eXtensible Markup Language (XML) messages and the adapters perform transformation according to extensible Stylesheet Language for Transformations (XSLT) stylesheets. The transformations may transform data between schemas for any of XML, Hypertext Transport Protocol (HTTP), Simple Object Access Protocol (SOAP), Web Service Definition Language (WSDL), extensible Scheme Diagram (XSD), Java Database Connectivity/Open Database Connectivity (JDBC/ODBC) or other message format, content standards, or communication protocols in place in the architectures 100 and 200.

FIG. 3 also shows additional detail of information prepared by the prepaid architecture 104 for processing by the telecommunications support architecture 102. In particular, the prepaid architecture 104 prepares detailed usage data 320 and aggregate usage data 322. The data 320 and 322 may represent prepaid and postpaid service use data for telecommunications services tracked by the prepaid architecture 104 or received from the mediation system 106. The detailed usage data 320 may be specified by a control file 324 and a detailed event file 326. Similarly, the aggregate usage data 322 may be specified by an aggregate event file 328. In one implementation, the control file 324, the detailed event file 326, and the aggregate event file 328 share a format which includes headers 330, 332, and 334, a data section 336, 338, and 340, and footers 342, 344, and 346.

The prepaid architecture 104 may communicate the detailed usage data 320 (e.g., through the detailed rated usage interface 148) and aggregate usage data 322 (e.g., through the aggregated usage interface 150) to the telecommunications support architecture 102 as streams of messages, as batches of files, and/or in other manners. For example, the prepaid architecture 104 may stream the detailed usage data 322 to the telecommunications support architecture 102 as soon as the detailed usage data 320 is available. Accordingly, the detailed usage data 320 arrives in the input data directory 348 of the telecommunications support architecture 102 as a detailed usage data stream 348.

As another example, the aggregate usage data 322 may arrive in the input data directory 348 of the telecommunications support architecture 102 as an aggregate batch file 352 for processing by the telecommunications support architecture 102. Any of the detailed usage data 320 and aggregate usage data 322 may be delivered to the telecommunications support architecture 102 via an FTP interface, or other communication mechanism.

The detailed usage data 320 may provide a record of each telecommunications service event for which the prepaid architecture 104 is configured to provide detailed usage data. The detailed event files 326 contain records specific to any given type of event, any number of which may be accompanied by a control file 324 when the detailed usage data 320 is delivered to the telecommunications support architecture 102.

The control file header 330, the detailed event file header 332, and the aggregate file header 334 may share a common format. Specifically, the headers 330 and 332 may be built as follows. Line 1 may identify the file as being a prepaid architecture file and may specify a file format (e.g., a text based data file). The second line may identify a pre-defined format from one or more possible pre-defined file formats for the file. Lines 3, 4, and 5 may define the character set, the type of the file, and the sub-type of the file. For example, the character set may be ASCII-8. As examples, the file type may specify a control file or an event file, and each type may have a subtype which identifies a specific type of service (e.g., wireline, SMS, or GSM service).

Lines 6, 7 and 8 may include information which confirms the identification of the file within a group of multiple files transferred to the telecommunications support architecture 102. Lines 9 and 10 provide two general purpose fields. In some implementations, lines 9 and 10 include distinguishing identifiers so that multiple concurrent processes may process at one time files which have different sources. Table 1, below, provides additional detail concerning the headers 330-334.

TABLE 1

| Line | Line Name | Length | Type | Null | Description |
|---|---|---|---|---|---|
| 1 | File ID | | Text | No | File identifier, e.g., "text_data_transfer_file" |
| 2 | Format | | Int | No | File format specifier, e.g., "1". |
| 3 | Character set | | Text | No | Character set specifier, e.g., "ASCII8". |
| 4 | File type | | Text | No | File type specifier, e.g., "control_file" for control files "events_file" for event files |
| 5 | File subtype | | Text | No | File sub-type specifier. For control files, the sub-type may be a pre-determined value, e.g., "Generated Events" For event files, the sub-type may identify any event type, such as GSM, Internet, IPTV, or other service. |
| 6 | File group number | 10 | Int | No | Sequential number of the import file group stream. For control files this may be the sequence number of the group of files referenced by the control file. It typically matches the sequence number that is present in the name of the Control file (for example 0000001). For event files, the value of this field may be set to "1". |
| 7 | File in group number | 10 | Int | No | In control files this field may be set to "0". For event files, this field may provide a progressive number of the file contained within the group. For example, if there are 2 Event files to send and this is the first Event file header, then the header the value is "1". |
| 8 | Total files in group | 10 | Int | No | The total number of event files in the file group. For example if the Control file is related to 2 Event files the value is "2") |

TABLE 1-continued

| Line | Line Name | Length | Type | Null | Description |
|------|-----------|--------|------|------|-------------|
| 9 | Source ID | 120 | Text | Yes | An optional identifier for the source of the file. Its value may vary from one implementation to another. This field may contain information that can be used to partition processing of the file in a multi-process environment. |
| 10 | Tag | 120 | Text | Yes | May provide a version number for the event file and is optional for control files. |

Table 2 provides an example of a control file header.

TABLE 2

ID: text_data_transfer_file
Format: 1
Character_set: ASCII8
File_type: control_file
File_subtype: GENERATED_EVENTS
File_group_number: 0000001
File_in_group_number: 0
Total_files_in_group: 2
Source_ID: rating system
Tag: rating system Table 3 provides an example of an event file header.

TABLE 3

ID: text_data_transfer_file
Format: 1
Character_set: ASCII8
File_type: Events_file
File_subtype: Events_PreRated_SMS
File_group_number: 1
File_in_group_number: 1
Total_files_in_group: 2
Source_ID: rating system
Tag: -v9

The control file footer 342 and detailed event file footer 344 may also share a common format shown below in Table 4.

TABLE 4

| Line | Name | Length | Type | Null | Description |
|------|------|--------|------|------|-------------|
| 1 | File ID | | Text | No | File identifier, e.g., 'text_data_transfer_file'. |
| 2 | Audit Value 1 | 9 | Int | No | For control files, the field may be set to the total number of event files in the file group. For event files the field may be set to: '0'. |
| 3 | Audit Value 2 | 9 | Int | No | May provide additional audit data. |
| 4 | End | | Text | No | May be set to 'text_data_transfer_file'. |
| 5 | Lines | 9 | Int | No | May be set to the total number of lines inside file. May also be set to '0'. |
| 6 | Characters | | Int | No | May be set to the total number of characters inside file. May also be set to '0'. |
| 7 | File Checksum | 10 | Text | Yes | Provides an error checking checksum. May be NULL. |
| 8 | Security checksum | 10 | Text | Yes | Provides an addition error checking checksum. May be NULL. |
| 9 | End of file | | N/A | Yes | End of file marker. May be NULL. |

Table 5 provides an example of a footer for control and event files.

TABLE 5

Footer: text_data_transfer_file
AuditValue_1: 2
AuditValue_2: 0
End: text_data_transfer_file
Lines: 0

TABLE 5-continued

Characters: 0
Checksum:
Security_checksum:
End_of_file:

Table 6, below, shows an example implementation of the data section 336 in a control file.

TABLE 6

| Line | Name | Length | Type | Null | Description |
|---|---|---|---|---|---|
|  | ID | 4 | Text | No | An identifier, e.g., "File". |
| 1 | File Name |  | Text | No | Provides the name of the event file, e.g., without the directory path. If the event file has an extension, the extension may be included. |
| 2 | File type |  | Text | No | The type of the data file, e.g., "Events_File". |
| 3 | File Subtype |  | Text | No | The subtype of the data file. |
| 4 | Number in group |  | Int | No | Provides the progressive number of the file contained within the group for each event file listed. |
| 5 | File length |  | Int | Yes | May provide the length in bytes of the file when read by an application. |
| 6 | File checksum | 8 | Text | Yes | May provide the checksum value for the file. |
| 7 | Security checksum | 8 | Text | Yes | May provide a security checksum value for the file. |
| 8 | Audit value 1 | 9 | Int | Yes | Provides an optional audit trail value which may be written to a log file. |
| 9 | Audit value 2 | 9 | Int | Yes | Provides a second optional audit trail value which may be written to a log file. |

Table 7 provides an example of a data record for a control file.

TABLE 7

Figure 7:
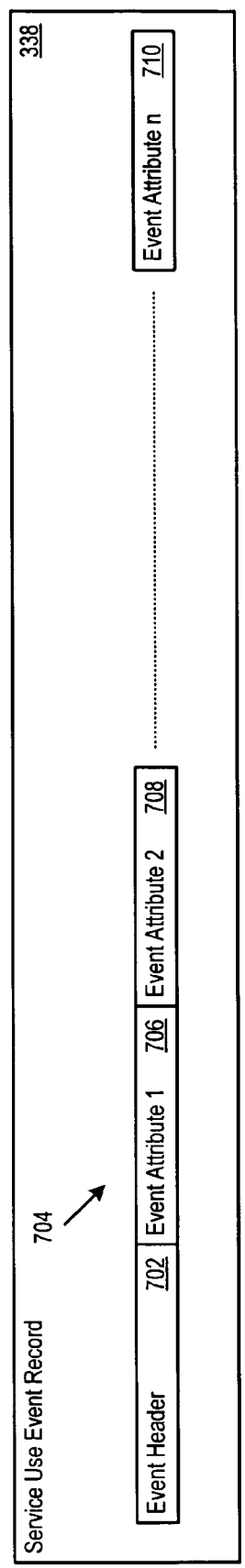
FIG. 7 shows a service use event record definition established in a service usage interface from the prepaid rating system to the telecommunications support architecture.

ID: File
File name: "event_GSM.20041125180000"
File Type: "Events_File"
File Subtype: "Events_PreRated_GSM"
Number: "1"
File length:
File checksum:
Security checksum:
Audit Value 1
Audit Value 2:

FIG. 7 illustrates the content of a service use event record which may be provided by the detailed event file data section 338. FIG. 7 shows that the data section 338 includes an event header 702 and event attributes 704. Any number of event attributes 704 may be provided, and three are specifically labeled as event attributes 706, 708, and 710.

The data section 338 provides an efficient mechanism for transferring usage data to the telecommunications support architecture 102 over a vast range of different event types, each of which may specify different event characteristics. Inside each data section 338 is a common event header followed by an event attribute list. The attribute list provides data fields which store information which characterizes any particular event. Thus, the data section 338 need not change, and new events may be defined at any time, with the data section 338 providing a consistent transport mechanism for the event characteristics. Furthermore, established events may be modified without the need to redefine the data section 338.

Table 8, below, shows an example implementation of the data section 338 in an event file. Table 8 defines an event header that extends up to the "Authorization Code" field, followed by event attributes.

TABLE 8

| Line | Name | Length | Type | Null | Description |
|---|---|---|---|---|---|
|  | Tag | 5 | Text | No | May specify an event data record, e.g., "Event" |
| 1 | Event Source | 40 | Text | No | Provides the source of the event, for example the apparent CLI (Calling Line Identifier) for a telephone call. This line may provide the Mobile Station Integrated Services Digital Network (MSISDN) for the services which are part of a GSM subscription. It may provide the login of the subscriber for the Internet based services, including IPTV, VoIP, and general purpose Internet connectivity. |
| 2 | Event Type | 9 | Int | No | Provides the type of the event and may be an integer that identifies the type of usage. |
| 3 | Event DTM |  | DTM | No | Provides the date and time at which the event took place (for billing purposes). For example, for a telephone call this line provides the time that the call started. The following format may be used: yyyy/mm/dd-hh-mm-ss.tt |

TABLE 8-continued

| Line | Name | Length | Type | Null | Description |
|---|---|---|---|---|---|
| 4 | Cost Center | 9 | Int | Yes | Provides an optional cost center number for the event to be allocated to. |
| 5 | Currency Code | 3 | Text | Yes | Provides the currency of the incoming event, e.g., EUR or USD. |
| 6 | Event cost | 10 | Int | Yes | Provides the rated cost of the event (including any applied discounts). The cost may be specified in tenths of a smallest currency unit (e.g., in tenths of a cent). |
| 7 | Loyalty points | 9 | Int | Yes | Provides a loyalty point value of the event. This line may be left NULL if loyalty points are determined elsewhere. |
| 8 | Competitor Cost | 10 | Int | Yes | Provides a competitor's rated undiscounted cost of the event, if known. |
| 9 | Internal Cost | 10 | Int | Yes | Provides the internal cost of the event, e.g., the undiscounted price of an event. The cost may be specified in tenths of a cent. |
| 10 | External cost | 10 | Int | Yes | Provides the buying-in price for the event. For telephony, for example, this provides the interconnect cost. For pay per view television, for example, this provides the price paid to the copyright owner. |
| 11 | Tax Override | 9 | Int | Yes | Determines the taxes applied to the event at bill time. |
| 12 | Authorization code | 40 | Text | Yes | Provides an authorization code of for the associated event. |
| 13 | Event attribute 1 | 40 | Text | Yes | Provides an attribute of the event, e.g., event duration specified as:<br>Time:<br>TI - hh:mm:ss<br>Tenths of seconds:<br>TT - hh:mm:ss.tt<br>Seconds:<br>TS - s |
| 14 | Event attribute 2 | 40 | Text | Yes | Provides an additional event attribute. |
| 15 | Event attribute 3 | 40 | Text | Yes | Provides an additional event attribute. |
| 16 | Event attribute 4 | 40 | Text | Yes | Provides an additional event attribute. |
| 17 | Event attribute 5 | 40 | Text | Yes | Provides an additional event attribute. |
| 18 | Event attribute 6 | 40 | Text | Yes | Provides an additional event attribute. |
| 19 | Event attribute 7 | 40 | Text | Yes | Provides an additional event attribute. |
| 20 | Event attribute 8 | 40 | Text | Yes | Provides an additional event attribute. |
| 21 | Event attribute 9 | 40 | Text | Yes | Provides an additional event attribute. |
| 22 | Event attribute 10 | 40 | Text | Yes | Provides an additional event attribute. |
| 23 | Event attribute 11 | 40 | Text | Yes | Provides an additional event attribute. |
| 24 | Event attribute 12 | 40 | Text | Yes | Provides an additional event attribute. |
| 25 | Event attribute 13 | 40 | Text | Yes | Provides an additional event attribute. |
| 26 | Event attribute 14 | 40 | Text | Yes | Provides an additional event attribute. |
| 27 | Event attribute 15 | 40 | Text | Yes | Provides an additional event attribute. |
| 28 | Event attribute 16 | 40 | Text | Yes | Provides an additional event attribute. |
| 29 | Event attribute 17 | 40 | Text | Yes | Provides an additional event attribute. |
| 30 | Event attribute 18 | 40 | Text | Yes | Provides an additional event attribute. |
| 31 | Event attribute 19 | 40 | Text | Yes | Provides an additional event attribute. |
| 32 | Event attribute 20 | 40 | Text | Yes | Provides an additional event attribute. |

TABLE 8-continued

| Line | Name | Length | Type | Null | Description |
|---|---|---|---|---|---|
| 33 | Event attribute 21 | 40 | Text | Yes | Provides an additional event attribute. |
| 34 | Event attribute 22 | 40 | Text | Yes | Provides an additional event attribute. |
| 35 | Event attribute 23 | 40 | Text | Yes | Provides an additional event attribute. |
| 36 | Event attribute 24 | 40 | Text | Yes | Provides an additional event attribute. |

Figure 8:
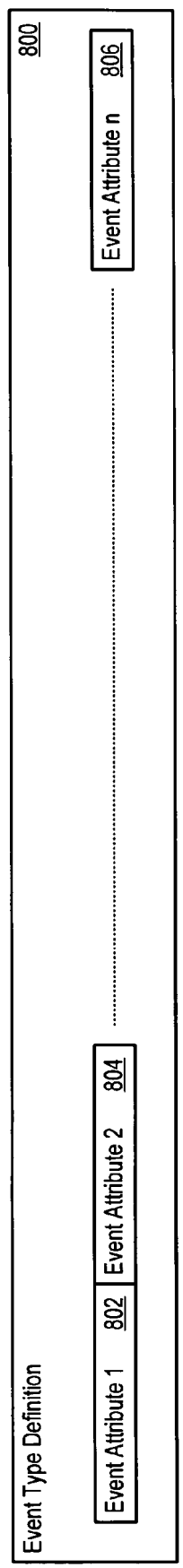
FIG. 8 shows an event type definition which may be used in conjunction with the service use event record definition.

The prepaid architecture 104 also establishes multiple event type definitions. Each definition may include an event attribute definition section which specifies event attributes which characterize the event. The event attributes are inserted into the data section 338 in the event file. FIG. 8 illustrates an event type definition 800. Each event type definition 800 specifies any number of event attributes for insertion into the data section 338, and three are specifically labeled as event attributes 802, 804, and 806.

Table 9, below, shows an example implementation of an event type definition for GSM voice traffic.

TABLE 9

DETAILED GSM VOICE TRAFFIC
Event Type: 19
File Type: Events_file
File subtype: Events_PreRated_GSM

| Attr. Number | Attribute Name | Type | Description |
|---|---|---|---|
| 1 | A Number | TX | Provides a calling number (MSISDN) for the usage event as it will be displayed on the invoice. |
| 2 | B Number | TX | Provides the called number for the usage event as it will be displayed on the invoice. |
| 3 | B Number Location | TX | Provides a description for the called number location as it will be displayed on the invoice. For example, this field may include the name of the city or country to which the call is directed. For calls to other mobile phones, this field may provide the name of the mobile operator owning the B number. |
| 4 | Duration | TS | Provides the total duration of the call in seconds. |
| 5 | IMSI | TX | Provides the calling IMSI for the usage event. |
| 6 | EDR Identifier | TX | Provides a unique identifier of the EDR (Event Data Record) in prepaid architecture. |
| 7 | Cost Band | TX | Provides the name of the cost band that has been used to price the call. (e.g., Local, National, International Zone 1) |
| 8 | Time Band | TX | Provides the name of the time band that has been used to price the call. (e.g., peak, off-peak, Flat Rate) |
| 9 | Rating Tariff | TX | Provides the name of the tariff that has been used to rate the event, as it will be displayed on the invoice. |

Table 10, below, shows an example implementation of an event type definition for general packet radio service traffic.

TABLE 10

DETAILED GPRS DATA TRAFFIC
Event Type: 20
File Type: Events_file
File subtype: Events_PreRated_GPRS

| Attr. Number | Attribute Name | Type | Description |
|---|---|---|---|
| 1 | A Number | TX | Provides the calling number (MSISDN) for the usage event as it will be displayed on the invoice. |
| 2 | URL Visited | TX | The name of the URL visited for the GPRS session or sub-session. |
| 3 | Total Volume | IN | The total volume of data transferred during the event. The value may be specified in Kbytes. |
| 4 | Downlink Volume | IN | The total downlink volume of data transferred during the event, as it will be displayed on the invoice. The value may be specified in Kbytes. |
| 5 | Uplink Volume | IN | The total uplink volume of data transferred during the event, as it will be displayed on the invoice). The value may be specified in Kbytes. |
| 6 | APN | TX | The name of the Access Point Network that has been used for this event, as it will be displayed on the invoice) (e.g., uni.premium.com, uni.standard.com) |
| 7 | IMSI | TX | The calling IMSI for the usage event. |
| 8 | EDR Identifier | TX | A unique identifier of the EDR (Event Data Record) in the prepaid architecture 104. |
| 9 | Cost Band | TX | The name of the cost band that has been used to price the call. (e.g., Premium Connection, Standard Connection. |
| 10 | Time Band | TX | The name of the time band that has been used to price the event. (e.g., peak, off-peak, Flat Rate). |
| 11 | Rating Tariff | TX | The name of the tariff that has been used to rate the event. |

Table 11, below, shows an example implementation of an event type definition for SMS data traffic.

TABLE 11

DETAILED SMS DATA TRAFFIC
Event Type: 21
File Type: Events_file
File subtype: Events_PreRated_SMS

| Attr. Number | Attribute Name | Type | Description |
|---|---|---|---|
| 1 | A Number | TX | The calling number (MSISDN) for the usage event as it will be displayed on the invoice. |
| 2 | B Number | TX | The called number for the usage event as it will be displayed on the invoice. |
| 3 | B Number Location | TX | A description for the called number location as it will be displayed on the invoice. This field may provide the name of the city or country to which the call is directed, or the |

TABLE 11-continued

DETAILED SMS DATA TRAFFIC
Event Type: 21
File Type: Events_file
File subtype: Events_PreRated_SMS

| Attr. Number | Attribute Name | Type | Description |
|---|---|---|---|
| | | | name of a mobile operator for a call to other mobile phones. |
| 4 | IMSI | TX | The calling IMSI for the usage event. |
| 5 | Quantity | IN | Quantity associated to the usage event. |
| 6 | EDR Identifier | TX | A unique identifier of the EDR (Event Data Record) in prepaid architecture. |
| 7 | Cost Band | TX | The name of the cost band that has been used to price the call. |
| 8 | Time Band | TX | The name of the time band that has been used to price the call. |
| 9 | Rating Tariff | TX | The name of the tariff that has been used to rate the event, as it will be displayed on the invoice. |

Table 12, below, shows an example implementation of an event type definition for MMS data traffic.

TABLE 12

DETAILED MMS DATA TRAFFIC
Event Type: 22
File Type: Events_file
File subtype: Events_PreRated_MMS

| Attr. Number | Attribute Name | Type | Description |
|---|---|---|---|
| 1 | A Number | TX | The calling number (MSISDN) for the usage event as it will be displayed on the invoice. |
| 2 | B Number | TX | The called number for the usage event as it will be displayed on the invoice. |
| 3 | B Number Location | TX | A description for the called number location as it will be displayed on the invoice. |
| 4 | IMSI | TX | The calling IMSI for the usage event. |
| 5 | Quantity | IN | Quantity associated to the usage event. |
| 6 | EDR Identifier | TX | A unique identifier of the EDR (Event Data Record) in the prepaid architecture. |
| 7 | Cost Band | TX | The name of the cost band that has been used to price the call. |
| 8 | Time Band | TX | The name of the time band that has been used to price the call. |
| 9 | Rating Tariff | TX | The name of the tariff that has been used to rate the event, as it will be displayed on the invoice. |

Table 13, below, shows an example implementation of an event type definition for other data content traffic.

TABLE 13

DETAILED Content TRAFFIC
Event Type: 23
File Type: Events_file
File subtype: Events_PreRated_Content

| Attr. Number | Attribute Name | Type | Description |
|---|---|---|---|
| 1 | A Number | TX | The calling number (MSISDN) for the usage event as it will be displayed on the invoice. |
| 2 | Total Downlink Volume | IN | The total volume of data transferred during the event, in Kbytes. |
| 3 | Service Provider | TX | Name of the content provider. |
| 4 | Content Category | TX | Category of content downloaded (e.g. News, Ring-Tones, and Games as it will appear on the invoice. |
| 5 | Content Description | TX | Additional description of the content event (e.g. a song name or game category) |
| 6 | Quantity | IN | Number of downloads. |
| 7 | IMSI | TX | The calling IMSI for the usage event. |
| 8 | EDR Identifier | TX | A unique identifier of the EDR (Event Data Record) in the prepaid architecture. |
| 9 | Cost Band | TX | The name of the cost band that has been used to price the call. |
| 10 | Time Band | TX | The name of the time band that has been used to price the event. |
| 11 | Rating Tariff | TX | The name of the tariff that has been used to rate the event, as it will be displayed on the invoice. |

Table 14, below, shows an example implementation of an event type definition for streaming video traffic.

TABLE 14

DETAILED VideoStreaming TRAFFIC
Event Type: 24
File Type: Events_file
File subtype: Events_PreRated_VideoStreaming

| Attr. Number | Attribute Name | Type | Description |
|---|---|---|---|
| 1 | A Number | TX | The calling number (MSISDN) for the usage event as it will be displayed on the invoice. |
| 2 | Total Downlink Volume | IN | The total volume of data transferred during the event, in Kbytes. |
| 3 | Service Provider | TX | Name of the content provider. |
| 4 | Stream Category | TX | Category of the stream downloaded (e.g. "Movie" or "Song") as it will appear on the invoice. |
| 5 | Stream Description | TX | A description of the stream content (e.g. a movie name or genre |
| 6 | Quantity | IN | Number of events contained in the stream. |
| 7 | IMSI | TX | The calling IMSI for the usage event. |
| 8 | EDR Identifier | TX | A unique identifier of the EDR (Event Data Record) in the prepaid architecture. |
| 9 | Cost Band | TX | The name of the cost band that has been used to price the call. |
| 10 | Time Band | TX | The name of the time band that has been used to price the event. |
| 11 | Rating Tariff | TX | The name of the tariff that has been used to rate the event, as it will be displayed on the invoice. |

Table 15, below, shows an example implementation of an event type definition for Internet traffic.

TABLE 15

DETAILED Internet TRAFFIC
Event Type: 25
File Type: Events_file
File subtype: Events_PreRated_Internet

| Attr. Number | Attribute Name | Type | Description |
|---|---|---|---|
| 1 | A Number | TX | The login name of the calling party for the usage event as it will be displayed on the invoice. (e.g. username@service.com). |
| 2 | B Number | TX | The called number for the usage event as it will be displayed on the invoice. |
| 3 | B Number Location | TX | A description for the called number location as it will be displayed on the invoice. |
| 4 | Duration | TS | The total duration of the internet connection in seconds. |
| 6 | EDR Identifier | TX | A unique identifier of the EDR (Event Data Record) in the prepaid architecture. |
| 7 | Cost Band | TX | The name of the cost band that has been used to price the call. |
| 8 | Time Band | TX | The name of the time band that has been used to price the call. |
| 9 | Rating Tariff | TX | The name of the tariff that has been used to rate the event, as it will be displayed on the invoice. |

Table 16, below, shows an example implementation of an event type definition for Voice over Internet Protocol traffic.

TABLE 16

DETAILED VOIP TRAFFIC
Event Type: 26
File Type: Events_file
File subtype: Events_PreRated_VOIP

| Attr. Number | Attribute Name | Type | Description |
|---|---|---|---|
| 1 | A Number | TX | The login name of the calling party for the usage event as it will be displayed on the invoice. |
| 2 | B Number | TX | The called number or reached login name for the usage event as it will be displayed on the invoice. |
| 3 | B Number Location | TX | A description for the called number location as it will be displayed on the invoice. |
| 4 | Duration | TS | The total duration of the call in seconds. |
| 5 | EDR Identifier | TX | A unique identifier of the EDR (Event Data Record) in the prepaid architecture. |
| 6 | Cost Band | TX | The name of the cost band that has been used to price the call. |
| 7 | Time Band | TX | The name of the time band that has been used to price the call. |
| 8 | Rating Tariff | TX | The name of the tariff that has been used to rate the event, as it will be displayed on the invoice. |

Table 17, below, shows an example implementation of an event type definition for IP Television traffic.

TABLE 17

DETAILED IP-TV TRAFFIC
Event Type: 27
File Type: Events_file
File subtype: Events_PreRated_IP-TV

| Attr. Number | Attribute Name | Type | Description |
|---|---|---|---|
| 1 | A Number | TX | The login name of the calling party for the usage event as it will be displayed on the invoice. |

TABLE 17-continued

DETAILED IP-TV TRAFFIC
Event Type: 27
File Type: Events_file
File subtype: Events_PreRated_IP-TV

| Attr. Number | Attribute Name | Type | Description |
|---|---|---|---|
| 2 | Total Volume | IN | The total volume of data transferred during the event, in Kbytes. |
| 3 | Service Provider | TX | Name of the content provider. |
| 4 | Content Category | TX | Category of content (e.g. "Show", "Soccer Match", or "TV Movie") as it will appear on the invoice. |
| 5 | Content Description | TX | Additional description of the content. (e.g., a movie name) |
| 6 | Quantity | IN | Number of content events in the stream. |
| 7 | IMSI | TX | The calling IMSI for the usage event. |
| 8 | EDR Identifier | TX | A unique identifier of the EDR (Event Data Record) in the prepaid architecture. |
| 9 | Cost Band | TX | The name of the cost band that has been used to price the call. |
| 10 | Time Band | TX | The name of the time band that has been used to price the event. |
| 11 | Rating Tariff | TX | The name of the tariff that has been used to rate the event, as it will be displayed on the invoice. |

The aggregated usage data 322 may be provided to the telecommunications support architecture 102 on a regular basis (e.g., by a monthly batch file). The aggregated event files 328 may follow the same format as the control files 324 and detailed event files 326. Examples of event type definitions for aggregated data are given below.

Table 18, below, shows an example implementation of an aggregated event type definition for GSM voice traffic.

TABLE 18

AGGREGATED GSM VOICE TRAFFIC
Event Type: 28
File Type: Events_file
File subtype: Events_PreRated_Agg_GSM

| Attr. Number | Attribute Name | Type | Description |
|---|---|---|---|
| 1 | A Number | TX | The calling number (MSISDN) for the usage event as it will be displayed on the invoice. |
| 2 | Duration | TS | The aggregated duration of the calls in seconds. |
| 3 | IMSI | TX | The calling IMSI for the usage event. |
| 4 | Cost Band | TX | The name of the cost band that has been used to price the call. |
| 5 | Time Band | TX | The name of the time band that has been used to price the call. |
| 6 | Rating Tariff | TX | The name of the tariff that has been used to rate the event, as it will be displayed on the invoice. |
| 7 | Number of events | IN | Total number of events included in this aggregated stream. |

Table 19, below, shows an example implementation of an aggregated event type definition for GPRS data traffic.

TABLE 19

AGGREGATED GPRS DATA TRAFFIC
Event Type: 29
File Type: Events_file
File subtype: Events_PreRated_Agg_GPRS

| Attr. Number | Attribute Name | Type | Description |
|---|---|---|---|
| 1 | A Number | TX | This is the calling number (MSISDN) for the usage event as it will be displayed on the invoice. |
| 2 | Total Volume | IN | This is the aggregated volume of data transferred. The vale has to be filled in Kbytes. (e.g. 510.600) |
| 3 | Downlink Volume | IN | This is the aggregated downlink volume of data transferred, as it will be displayed on the invoice. The vale has to be filled in Kbytes (e.g. 310.600). |
| 4 | Uplink Volume | IN | This is the aggregated uplink volume of data transferred, as it will be displayed on the invoice. The vale has to be filled in Kbytes (e.g. 200.000). |
| 5 | IMSI | TX | This is the calling IMSI for the usage event. |
| 6 | Cost Band | TX | This is the name of the cost band that has been used by Am-Beo to price the call. (e.g., Premium Connection or Standard Connection). |
| 7 | Time Band | TX | This is the name of the time band that has been used by Am-Beo to price the event. (e.g., peak, off-peak, or Flat Rate). |
| 8 | Rating Tariff | TX | This is the name of the tariff that has been used by Am-Beo to rate the event, as it will be displayed on the invoice. |
| 9 | Number of events | IN | Total number of events included in this aggregated stream. |

Table 20, below, shows an example implementation of an aggregated event type definition for SMS data traffic.

TABLE 20

AGGREGATED SMS DATA TRAFFIC
Event Type: 30
File Type: Events_file
File subtype: Events_PreRated_Agg_SMS

| Attr. Number | Attribute Name | Type | Description |
|---|---|---|---|
| 1 | A Number | TX | The calling number (MSISDN) for the usage event as it will be displayed on the invoice. |
| 2 | IMSI | TX | The calling IMSI for the usage event. |
| 3 | Cost Band | TX | The name of the cost band that has been used to price the call. |
| 4 | Time Band | TX | The name of the time band that has been used to price the call. |
| 5 | Rating Tariff | TX | The name of the tariff that has been used to rate the event, as it will be displayed on the invoice. |
| 6 | Number of events | IN | Total number of events included in this aggregated stream. |

Table 21, below, shows an example implementation of an aggregated event type definition for MMS data traffic.

TABLE 21

AGGREGATED MMS DATA TRAFFIC
Event Type: 31
File Type: Events_file
File subtype: Events_PreRated_Agg_MMS

| Attr. Number | Attribute Name | Type | Description |
|---|---|---|---|
| 1 | A Number | TX | The calling number (MSISDN) for the usage event as it will be displayed on the invoice. |
| 2 | IMSI | TX | The calling IMSI for the usage event. |
| 3 | Cost Band | TX | The name of the cost band that has been used to price the call. |
| 4 | Time Band | TX | The name of the time band that has been used to price the call. |
| 5 | Rating Tariff | TX | The name of the tariff that has been used to rate the event, as it will be displayed on the invoice. |
| 6 | Number of events | IN | Total number of events included in this aggregated stream. |

Table 22, below, shows an example implementation of an aggregated event type definition for general content traffic.

TABLE 22

AGGREGATED Content TRAFFIC
Event Type: 32
File Type: Events_file
File subtype: Events_PreRated_Agg_Content

| Attr. Number | Attribute Name | Type | Description |
|---|---|---|---|
| 1 | A Number | TX | The calling number (MSISDN) for the usage event as it will be displayed on the invoice. |
| 2 | Total Downlink Volume | IN | The aggregated volume of data transferred, in Kbytes. |
| 3 | IMSI | TX | The calling IMSI for the usage event. |
| 4 | Cost Band | TX | The name of the cost band that has been used to price the call. |
| 5 | Time Band | TX | The name of the time band that has been used to price the event. |
| 6 | Rating Tariff | TX | The name of the tariff that has been used to rate the event, as it will be displayed on the invoice. |
| 7 | Number of events | IN | Total number of events included in this aggregated stream. |

Table 23, below, shows an example implementation of an aggregated event type definition for streaming video traffic.

TABLE 23

AGGREGATED VideoStreaming TRAFFIC
Event Type: 33
File Type: Events_file
File subtype: Events_PreRated_Agg_VideoStreaming

| Attr. Number | Attribute Name | Type | Description |
|---|---|---|---|
| 1 | A Number | TX | The calling number (MSISDN) for the usage event as it will be displayed on the invoice. |
| 2 | Total Downlink Volume | IN | The aggregated volume of data transferred during the event, in Kbytes. |
| 3 | IMSI | TX | The calling IMSI for the usage event. |
| 4 | Cost Band | TX | The name of the cost band that has been used to price the call. |
| 5 | Time Band | TX | The name of the time band that has been used to price the event. |
| 6 | Rating Tariff | TX | The name of the tariff that has been used to rate the event, as it will be displayed on the invoice. |
| 7 | Number of events | IN | Total number of events included in this aggregated stream. |

Table 24, below, shows an example implementation of an aggregated event type definition for Internet traffic.

TABLE 24

AGGREGATED Internet TRAFFIC
Event Type: 34
File Type: Events_file
File subtype: Events_PreRated_Agg_Internet

| Attr. Number | Attribute Name | Type | Description |
|---|---|---|---|
| 1 | A Number | TX | The login name of the calling party for the usage event as it will be displayed on the invoice. |
| 2 | Duration | TS | The aggregated duration of the internet connection in seconds. |
| 3 | Cost Band | TX | The name of the cost band that has been used to price the call. |
| 4 | Time Band | TX | The name of the time band that has been used to price the call. |
| 5 | Rating Tariff | TX | The name of the tariff that has been used to rate the event, as it will be displayed on the invoice. |
| 6 | Number of events | IN | Total number of events included in this aggregated stream. |

Table 25, below, shows an example implementation of an aggregated event type definition for Voice over IP traffic.

TABLE 25

AGGREGATED VOIP TRAFFIC
Event Type: 35
File Type: Events_file
File subtype: Events_PreRated_Agg_VOIP

| Attr. Number | Attribute Name | Type | Description |
|---|---|---|---|
| 1 | A Number | TX | The login name of the calling party for the usage event as it will be displayed on the invoice. |
| 2 | Duration | TS | The total duration of the call in seconds. |
| 3 | Cost Band | TX | The name of the cost band that has been used to price the call. |
| 4 | Time Band | TX | The name of the time band that has been used to price the call. |
| 5 | Rating Tariff | TX | The name of the tariff that has been used to rate the event, as it will be displayed on the invoice. |
| 6 | Number of events | IN | Total number of events included in this aggregated stream. |

Table 26, below, shows an example implementation of an aggregated event type definition for IP Television traffic.

TABLE 26

AGGREGATED IP-TV TRAFFIC
Event Type: 36
File Type: Events_file
File subtype: Events_PreRated_Agg_IP-TV

| Attr. Number | Attribute Name | Type | Description |
|---|---|---|---|
| 1 | A Number | TX | The login name of the calling party for the usage event as it will be displayed on the invoice. |
| 2 | Total Volume | IN | The total volume of data transferred during the event, in KBytes. |
| 3 | IMSI | TX | The calling IMSI for the usage event. |
| 4 | Cost Band | TX | The name of the cost band that has been used to price the call. |

TABLE 26-continued

AGGREGATED IP-TV TRAFFIC
Event Type: 36
File Type: Events_file
File subtype: Events_PreRated_Agg_IP-TV

| Attr. Number | Attribute Name | Type | Description |
|---|---|---|---|
| 5 | Time Band | TX | The name of the time band that has been used to price the event. |
| 6 | Rating Tariff | TX | The name of the tariff that has been used to rate the event, as it will be displayed on the invoice. |
| 7 | Number of events | IN | Total number of events included in this aggregated stream. |

As noted above, the architectures 100, 200 implement customer account management interfaces 138. The interfaces 138 include a prepaid account refill interface 142, a balance adjustment interface 144, and a subscriber account interface 146. Each interface 142-146 may define messages sent from the telecommunications support architecture 102 to the prepaid architecture 104 or the account and billing system 204. The messages may be XML messages sent with a SOAP call. For each message, the architectures 100 and 200 may define an XSD schema used to validate the XML to be sent in the SOAP call.

Figure 4:
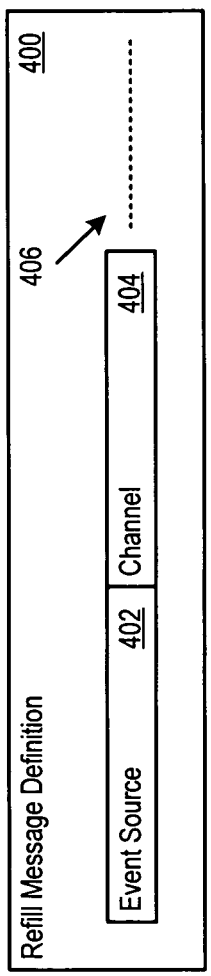
FIG. 4 shows a refill message definition established in a customer account management interface between the telecommunications support architecture and the prepaid architecture.

FIG. 4 shows a refill message definition 400 for refill messages communicated through the customer account management interface 138 (e.g., by the refill interface 142 or balance adjustment interface 144). A refill event (e.g., redemption of a prepaid voucher such as a scratch card) may cause the telecommunications support architecture 102 to send the refill message to inform the prepaid architecture 104 of the credit. The message definition 400 specifies an event source 402, a channel 404, and additional fields 406 explained below in an exemplary implementation shown in Table 27.

TABLE 27

Event: Refill
Web Service type: Synchronous
Transport: HTTP
Protocol: SOAP 1.1
Style: RPC/Encoded or Document/Literal

| Field Name | Exemplary Length | Note |
|---|---|---|
| EventSource | 100 | An identifier of the source of the refill event. The identifier may specify the telecommunications support architecture, or a line order identifier for refill defined in the telecommunications support architecture. |
| Channel | | Channel used to make the refill (e.g., IVR or ATM) |
| ScratchCardNumber | | Number of the scratch card used for the refill |
| TransactionCode | | Code of the refill transaction |
| Amount | | Amount to refill on the account |
| Currency | 20 | Currency used for the refill |
| RequestDate | 16 | Date of the refill. The format is: MM/DD/YYYY HH:MM |
| PaymentMethod | 5 | Payment method (e.g., credit card or bank account). |
| BankAccountNumber | 20 | Number of the bank account. |
| BankAccountType | 10 | International account type code. |
| BankBranch | 10 | Branch of the bank. |
| BankName | 100 | Name of the bank. |

TABLE 27-continued

Event: Refill
Web Service type: Synchronous
Transport: HTTP
Protocol: SOAP 1.1
Style: RPC/Encoded or Document/Literal

| Field Name | Exemplary Length | Note |
| --- | --- | --- |
| PayerFirstName | 80 | First name of the Main Bank Account/Credit Card Owner. |
| PayerLastName | 80 | Last name of the Main Bank Account/Credit Card Owner. |
| PayerPersonalID | 20 | Identification number of the Main Bank Account/Credit Card Owner. |
| CreditCardExpirationDate | 5 | Expiration Date of the Credit Card. The format is: MM/YY |
| CreditCardNumber | 20 | Number of the Credit Card. |
| CreditCardType | 30 | Type of the Credit Card. For example: "VISA" or "AMEX". |
| ProductCatalogId | 50 | A name or other identifier for the prepaid product or service. |
| BillAccountCode | 16 | Billing account identifier |
| RefilledObjectId | 15 | For a prepaid product this field contains an identifier of a predefined product. |

Figure 5:
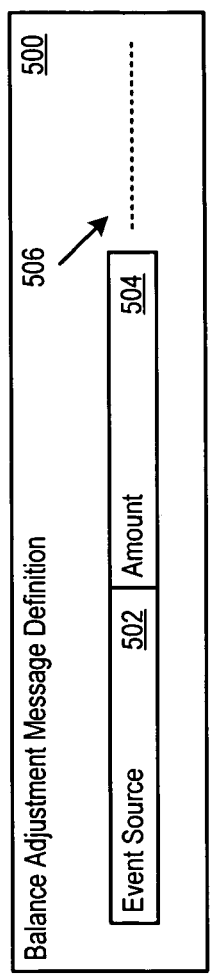
FIG. 5 shows a balance adjustment message definition established in a customer account management interface between the telecommunications support architecture and the prepaid architecture.

FIG. 5 shows a balance adjustment message definition 500 for balance adjustment messages communicated through the customer account management interface 138 (e.g., through the balance adjustment interface 144). An adjustment event (e.g., credit applied to a customer account) may cause the telecommunications support architecture 102 to send a balance adjustment message to modify (e.g., credit or debit) the balance of a prepaid or postpaid customer. The message definition 500 specifies an event source 502, an amount 504, and additional fields 506 explained below in an exemplary implementation shown in Table 28.

TABLE 28

Event: Adjustment
Web Service type: Synchronous
Transport: HTTP
Protocol: SOAP 1.1
Style: RPC/Encoded or Document/Literal

| Field Name | Exemplary Length | Note |
| --- | --- | --- |
| EventSource | 100 | An identifier of the source of the balance adjustment event. The identifier may specify the telecommunications support architecture, or a line order identifier for refill defined in the telecommunications support architecture. |
| Amount | 30 | Amount to be adjusted |
| Currency | 20 | Currency used for the adjustment |
| AccountType | 30 | An account type, e.g., prepaid or postpaid. |
| Type | 16 | Type of the adjustment (debit or credit) |
| Status | 16 | Adjustment status (approved or pre-approved) |
| StartDate | 16 | Activation date of the adjustment The format is: MM/DD/YYYY HH:MM |
| AdjustmentId | | An identifier assigned to the adjustment |
| CreatedByLogin | | Operator login that created the adjustment request |
| Description | | A description of the adjustment. |
| AdjustedObjectId | | For a prepaid product this field may specify an identifier of a prepaid product. For a postpaid product this field may specify an invoice number. |
| ReasonForRequest | | Reason for the adjustment request. |
| ProductCatalogId | 50 | A name for the prepaid product or service. |
| BillAccountCode | 16 | Billing Account Identifier |

Figure 6:
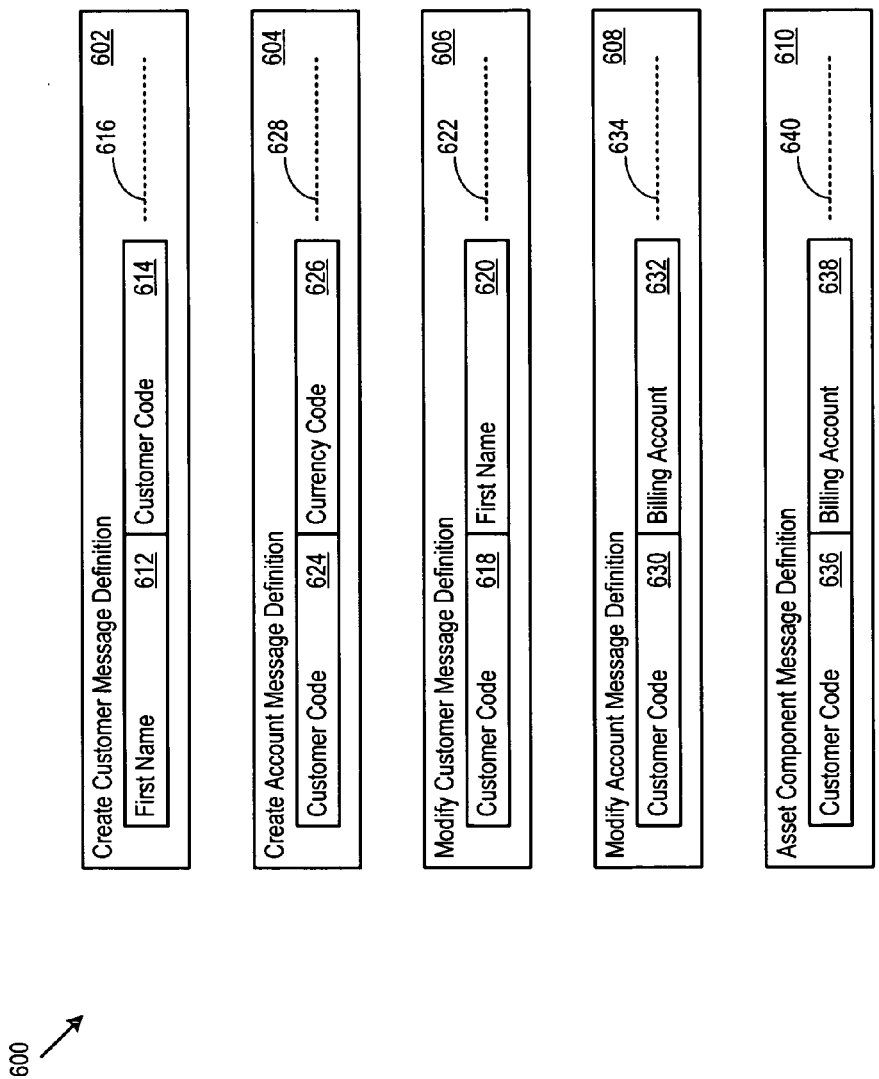
FIG. 6 shows subscriber account message definitions established as part of a subscriber account interface between the telecommunications support architecture and the prepaid architecture.

FIG. 6 shows a set of customer management messages 600 which may be communicated through the subscriber account interface 146. As examples, the subscriber account interface 146 may establish a create customer message definition 602 and a create account message definition 604. The account interface 146 may further define a modify customer message definition 606 a modify account message definition 608. An asset message definition 610 is also present.

The telecommunications support architecture 102 may initiate a create customer event when an order for a new customer is submitted. When the first order for a new customer is submitted, the telecommunications support architecture 102 sends to the billing system 110 and 206 the information which creates a customer in the billing system 110 and 206. Customer creation occurs before account creation since a customer may have one or more accounts. The billing system 110 and 206 may further differentiate the creation of a residential customer and a business customer based on the information received from the telecommunications support architecture 102.

The create customer message definition 602 includes a first name field 612, a customer code field 614, and additional data fields 616 explained below in an exemplary implementation shown in Table 29.

TABLE 29

Event: Create Customer
Web Service type: Synchronous
Transport: HTTP
Protocol: SOAP 1.1
Style: RPC/Encoded or Document/Literal

| Field Name | Exemplary Length | Note |
| --- | --- | --- |
| FirstName | 50 | First Name |
| CustomerCode | 30 | Customer Code |
| AcquisitionDate | 7 | Customer Since Date. The format is: MM/DD/YYYY HH:MM |
| PhyFlag | 1 | Distinguishes a physical person from an entity such as a partnership or corporation. |
| Language | 15 | Language Code |
| PersonalID | 50 | Customer identifier |
| Email | 50 | Principal e-mail address |
| FaxNum | 40 | Principal FAX Number |
| PhoneNum | 40 | Principal phone number |
| MSegment | 30 | Market Segment (e.g., Residential or Business) |
| Name | 10 | Last Name if customer is individual |
| LastUpdateDate | 7 | Date of the last update |
| Address | 200 | Address. |
| AddressNum | 30 | Street Number. |
| StreetType | 30 | Street Type. |
| City | 50 | City Name. |
| Country | 30 | Country/Province. |
| ZIP | 30 | ZIP Code. |
| State | 10 | Country Code. |
| OrganizationCode | 30 | An identifier of an organization to which the customer belongs. |

Customer data modifications include changes to any fields of the customer account, such as a change to a customer's name or address. The telecommunications support architecture 102 may handle customer modification events by sending a customer modification message to the systems 104 or 204 and/or the supporting billing systems 110, 206.

FIG. 6 shows that the modify customer message definition 606 includes a customer code field 618, a first name field 620, and additional data fields 622 explained below in an exemplary implementation shown in Table 30.

TABLE 30

Event: Modify Customer General Data
Web Service type: Synchronous
Transport: HTTP
Protocol: SOAP 1.1
Style: RPC/Encoded or Document/Literal

| Field Name | Exemplary Length | Note |
|---|---|---|
| CustomerCode | 20 | Customer Code. |
| FirstName | 50 | First Name |
| AcquisitionDate | 16 | Customer Since Date. The format is: MM/DD/YYYY HH:MM |
| PhyFlag | 1 | Distinguishes a physical person from an entity such as a partnership or corporation. |
| Language | 15 | Language used by the telecommunications support architecture to contact the customer. |
| PersonalID | 50 | Fiscal number |
| Email | 50 | Principal e-mail address |
| FaxNum | 40 | Principal FAX Number |
| PhoneNum | 40 | Principal phone number |
| MSegment | 30 | Market Segment (e.g., Residential or Business) |
| Name | 100 | Last Name |
| LastUpdateDate | 16 | Date of the last update. The format is: MM/DD/YYYY HH:MM |
| StatusCode | 30 | Customer status |
| StatusDescr | 50 | Description of the status |
| OrganizationCode | 30 | An identifier of an organization to which the customer belongs. |

The telecommunications support architecture 102 may initiate a create account event when an order for a new customer is submitted and after a new customer is created. The create account message definition 604 includes a customer code field 624, a currency code field 626, and additional data fields 628 explained below in an exemplary implementation shown in Table 31.

TABLE 31

Event: Create Account
Web Service type: Synchronous
Transport: HTTP
Protocol: SOAP 1.1
Style: RPC/Encoded or Document/Literal

| Field Name | Exemplary Length | Note |
|---|---|---|
| CustomerCode | 20 | Customer Code. |
| CurrencyCode | 20 | Invoice currency. |
| BillAccountCode | 16 | Billing Account Identifier |
| BillStartDate | 16 | Account Start Date, e.g., the date of first purchase The format is: MM/DD/YYYY HH:MM |
| BillStopDate | 16 | Account Stop Date. The format is: MM/DD/YYYY HH:MM |
| BillStatusChangeReas | 5 | Termination reason. |
| BillStatusCode | 16 | Account status code, e.g., acquired, suspended, or terminated. |
| LastUpdateDate | 16 | Date of the last update. The format is: MM/DD/YYYY HH:MM |
| AccountType | 10 | Prepaid or Postpaid |
| PaymentMethod | 5 | Payment method |
| BillFrequency | 30 | Bill Period (e.g., Quarterly or Monthly) |
| PayerFirstName | 80 | First name of the Main Bank Account/Credit Card Owner. |
| PayerLastName | 80 | Last name of the Main Bank Account/Credit Card. |
| ContactTitle | 15 | Title of the addressee of the billing invoice. |
| ContFirstName | 50 | First name of the addressee of the billing invoice. |
| ContLastName | 50 | Last name of the addressee of the billing invoice. |
| ContactEmail | 80 | E-mail of the addressee of the billing invoice. |
| ContactPhone | 20 | Phone number of the addressee of the billing invoice. |
| ContactWorkPhone | 40 | Phone number of the addressee of the billing invoice |
| StreetType | 80 | Street Type. |
| Address | 80 | Address. |
| AddressNum | 80 | Street Number. |
| City | 80 | City Name. |
| State | 80 | Province. |
| Zip | 16 | ZIP Code. |
| Country | 20 | Country Code. |
| PayerPersonalID | 20 | Identification number of the Main Bank Account/Credit Card Owner. |
| BankName | 100 | Name of the bank. |
| BankBranch | 10 | Branch of the bank. |

TABLE 31-continued

Event: Create Account
Web Service type: Synchronous
Transport: HTTP
Protocol: SOAP 1.1
Style: RPC/Encoded or Document/Literal

| Field Name | Exemplary Length | Note |
|---|---|---|
| BankAccountType | 10 | International bank account type code. |
| BankAccountNumber | 20 | Number of the bank account. |
| CreditCardNumber | 20 | Number of the Credit Card. |
| CreditCardType | 30 | Type of the Credit Card. |
| CreditCardExpirationDate | 5 | Expiration Date of the Credit Card. MM/YY |
| OrganizationCode | 30 | An identifier of an organization to which the customer belongs. |
| TaxType | 30 | V.A.T. Type. |
| MediaType | 5 | Type of media for invoices (e.g., paper or email) |
| BillType | 8 | Bill Format (e.g., summarized or detailed) |
| Language | 15 | Language Code that identifies the language of the template and item labels used in the bill. |

Customer account modifications include changes to any fields of the account, such as a change to an account currency or language. The telecommunications support architecture 102 may handle customer account modification events by sending a customer account modification message to the systems 104 or 204 and/or the supporting billing systems 110, 206.

FIG. 6 shows that the modify customer account message definition 608 includes a customer code field 630, a billing account field 632, and additional data fields 634 explained below in an exemplary implementation shown in Table 31.

TABLE 31

Event: Modify Account General Data
Web Service type: Synchronous
Transport: HTTP
Protocol: SOAP 1.1
Style: RPC/Encoded or Document/Literal

| Field Name | Exemplary Length | Note |
|---|---|---|
| CustomerCode | 20 | Customer Code. |
| BillAccountCode | 16 | Billing Account Identifier |
| BillStartDate | 16 | Account Start Date. The format is: MM/DD/YYYY HH:MM |
| BillStopDate | 16 | Account Stop Date. The format is: MM/DD/YYYY HH:MM |
| BillStatusChangeReas | 5 | Termination reason. |
| BillStatusCode | 16 | Account status code |
| CurrencyCode | 20 | Invoice currency. |
| Language | 15 | Language Code that identifies the language of the template and item labels used in the bill. |
| LastUpdateDate | 16 | Date of the last update. The format is: MM/DD/YYYY HH:MM |
| TaxType | 30 | V.A.T. Type. |
| Account Type | 10 | Prepaid or Postpaid. |
| OrganizationCode | 30 | An identifier of an organization to which the customer belongs. |

The customer account management interfaces 138 may also define an asset component message interface. The asset components may define in the billing system and/or rating system information about products, services, and discounts which inform the billing system how the products and services should be billed and rated. A discount may be implemented as a product with a negative cost. The system which receives the asset component message parses the event and identity of the products and discounts based on a product catalog identifier field.

FIG. 6 shows an asset component message definition 610 established in the asset component message interface. The definition 610 includes a customer code field 636, a billing account field 638, and additional fields 640 explained below in an exemplary implementation shown in Table 32.

TABLE 32

Event: Asset Component
Web Service type: Synchronous
Transport: HTTP
Protocol: SOAP 1.1
Style: RPC/Encoded or Document/Literal

| Field Name | Length Mandatory | Note |
|---|---|---|
| CustomerCode | 20 | Customer Code. |
| BillingAccountCode | 16 | An identifier of the account which pays for the service. |
| StartDate | 16 | The date when the product/service is started. The format is: MM/DD/YYYY HH:MM |
| ModifyDate | 16 | The date the product or service was last modified. The format is: MM/DD/YYYY HH:MM |
| EndDate | 16 | Termination date for product/service. The format is: MM/DD/YYYY HH:MM |
| ProductInstanceId | 30 | Unique identifier for the Product instance in the Billing system. |
| ActionCode | 30 | Action for the Service Element in the order. The actions may include Add (when a new product is purchased), Delete (when a product is deactivated), and Update (when there is a modification to product or service data). |
| ProductType | 30 | Type of the product. |
| ProductCatalogId | 50 | A name or other identifier for the prepaid product or service. |
| EventSource | 100 | An identifier of the source of the event. The identifier may specify the telecommunications support architecture, or a line order identifier for refill defined in the telecommunications support architecture. |

TABLE 32-continued

| | | |
|---|---|---|
| LineNumber | 22 | Product hierarchy level. |
| CRMOrderId | 30 | An Identifier for the Service Order. |
| SOrderType | 30 | Type of the Service Order (e.g., Add New Product, Modify, or Disconnect). |
| ParentProductId | 30 | Unique identifier for Parent product of the hierarchy. |
| OrganizationCode | 30 | An identifier of an organization to which the customer belongs. |
| TopProductId | 30 | Top product of the service element Hierarchy. |
| SalesForceID | 30 | Sales Force unique Identifier. |
| ServiceType | 30 | Type of the Service |
| Status | 30 | Status of the Service Order. |
| Tariff Id | 10 | Identifies a tariff to apply when rating an event. A default tariff may be applied if none is specified. The tariff may be passed as an XML attribute structure including a name specifier and a tariff identifier value. |

Figure 9:
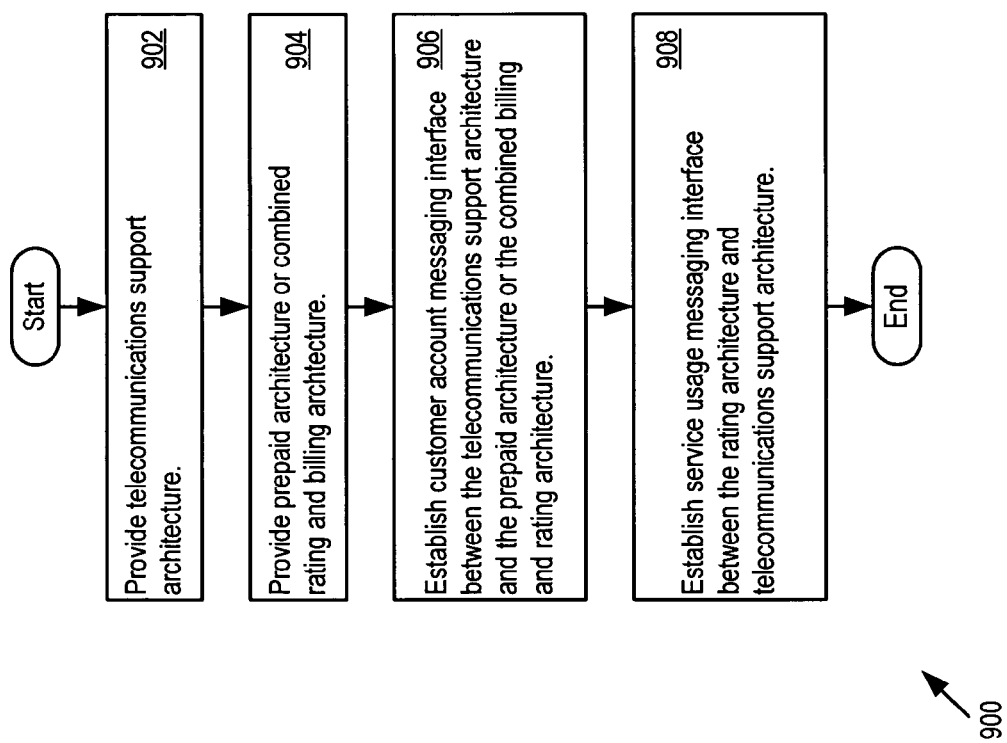
FIG. 9 shows the acts that may be taken to establish a convergent telecommunications architecture.

FIG. 9 shows the acts 900 that may be taken to establish a convergent telecommunications architecture. A telecommunications service provider establishes a telecommunications support architecture 102 or 202 (Act 902) and a prepaid architecture 104 or a combined rating and billing architecture 204. (Act 904). The systems are integrated using a messaging interface between the systems. The messaging interface may define a customer account management interface 138 (Act 906) which defines interfaces for sending customer account related messages from the telecommunications support architecture to the prepaid architecture 104 or rating and billing architecture 204. Furthermore, the messaging interface may define a service usage interface 140 (Act 908). The service usage interface may communicate prepaid and postpaid service usage information to the telecommunications support architecture 102 or 202.

Figure 10:
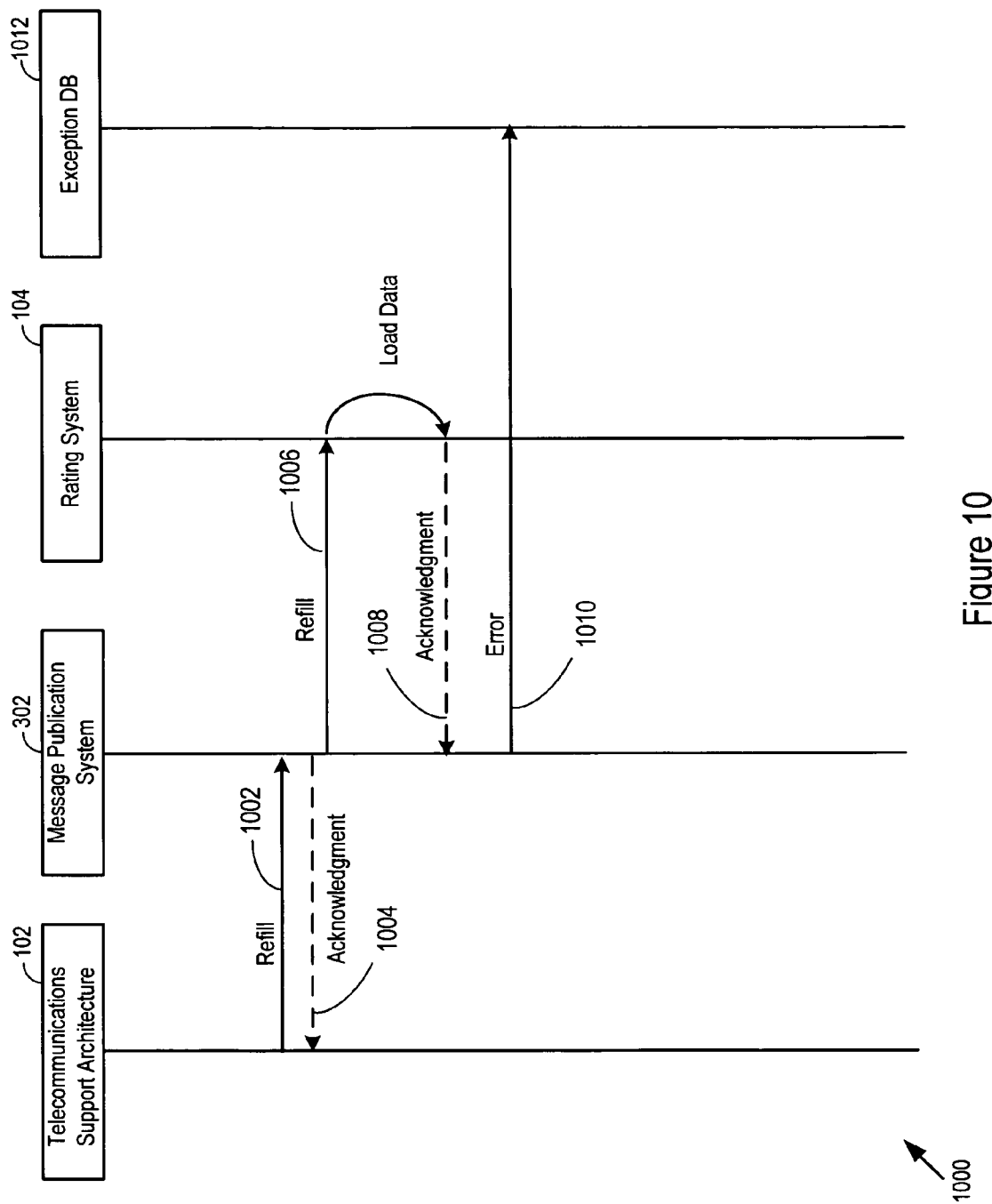
FIG. 10 shows a message flow for communicating a refill message from a customer care system to a prepaid architecture.

FIG. 10 shows a message flow 1000 resulting from communication of a refill message from a customer care system 102, 202 to the prepaid architecture 104 or the rating and billing architecture 204. The message flow 1000 illustrates exemplary interactions between systems in the architectures 100, 200 for the refill message. Each message defined by the messaging interfaces 138, 140 may be characterized by different interactions between systems.

The telecommunications support architecture 102 publishes a refill message 1002 to the message publication system 302. The message publication system 302 provides an acknowledgement 1004. The message publication system 302 also sends the refill message (optionally after adaptation) to subscribers of refill topics, including the prepaid architecture 104.

The adapted refill message 1006 arrives at the prepaid architecture 104 (or the combined rating and billing architecture 204). The systems 104 and/or 204 may communicate an acknowledgement message 1008 to the message publication system 302. After the adapted refill message 1006 arrives, the systems 104 and 204 process the message and refill the customer account balance. If the message publication system 302 cannot parse the refill message, or cannot deliver the refill message, the message publication system 302 may instead deliver an error reporting message 1010 to an exception database 1012 when error logs are maintained.

The convergent architectures 100, 200 reduce the cost and complexity of providing support for both prepaid and postpaid products and services. The messaging interfaces provide interaction between traditionally separate prepaid and postpaid processing systems and telecommunications support architectures. Accordingly, a telecommunications service provider may offer cross category products, discounts, and other service enhancements which include characteristics of both prepaid and postpaid products and services, with less architectural impact and less cost than completely replacing existing customer management and/or rating and billing architectures.

In meeting the technical challenges of providing an enhanced telecommunications service provider architecture, the messaging interfaces were designed to provide flexible and efficient communication of data between the customer care systems and the rating and billing architectures. In particular, the service usage interface 140 defines a message format which conveys information about a wide range of different events to the telecommunications support architecture 102.

The service usage interface 140 provides an extensible message format for delivering information to the telecommunications support architecture 102. The service use files are characterized by an event header and an event attribute list. The architectures 100 and 200 may then define multiple event type definitions independently of the service use event record. In other words, the service use event record need not change to support additional event types. Instead, a new event type definition may be provided which fits within the service use event record. Accordingly, the telecommunications architectures 100 and 200 efficiently and flexibly support the integration of prepaid and post-paid processing systems over a wide range of telecommunications products and services.

The convergent architectures 100 and 200 provide significant advantages, including service delivery technology independence, customer centric viewpoint, and payment method flexibility. Service delivery technology independence provides rating and billing for virtually all combinations of telecommunications products, services, and use events independently of the technology actually used to deliver the product or service. As a result, the architectures 100 and 200 provide common and consistent product infrastructures, reduced complexity through consolidated infrastructure, and reduced capital and operational expenditure costs.

The customer centric viewpoint provides a perspective of the customer and the customer billing across widely varying prepaid and postpaid industries and services. As a result, the architectures 100 and 200 may support offers for bundles of products and services from multiple different product and service lines which attracts and keeps customers. In addition, the architectures 100 and 200 support discounts across multiple products and services based on any particular product or service. The flexible support for products and services also allows rapid creation and rollout of new product and service offerings, as well as dynamic reconfiguration of existing offerings with lower risk and at lower cost.

Payment method flexibility permits handling either type of payment as well as varying whether any service within a customer account is prepaid or postpaid. Such flexibility attracts and retains customers regardless of their associated customer segment. This flexibility also allows customers to manage and control family spending through advanced balance control, credit control, hierarchy of accounts, and a unified balance maintained in the architectures 100 and 200 and which pays for any number of pre-paid services. Furthermore, the architectures 100 and 200 reduce financial risk through real time rating and associated credit control management.

While various embodiments of the invention have been described, it will be apparent to those of ordinary skill in the art that many more embodiments and implementations are possible. Accordingly, the invention is not to be restricted except in light of the attached claims and their equivalents.

I claim:

1. A convergent telecommunications system architecture comprising:
   a telecommunications support architecture comprising prepaid rating balances and post-paid account balances for service customers;
   a prepaid architecture that tracks service usage for a prepaid service; and
   a bi-directional messaging interface configured to connect the telecommunications support architecture and the prepaid architecture, the bi-directional messaging interface comprising:
      a prepaid account refill interface from the telecommunications support architecture to the prepaid architecture, the prepaid account refill interface including a refill message adapter comprising a refill message mapping from a telecommunications support architecture refill message to a prepaid architecture refill message, wherein the refill message mapping includes transforming a format used by the telecommunication support architecture to a second, different format used by the prepaid architecture; and
      a service usage interface from the prepaid architecture to the telecommunications support architecture, wherein the service usage interface includes:
         a service use event record having an event header;
         a dynamically configurable event attribute list; and
         multiple event type definitions, each including an event attribute definition which specifies event attributes configured to be inserted into the dynamically configurable event attribute list in the service use event record.

2. The architecture of claim 1, where the prepaid account refill interface comprises a refill event message definition for the telecommunications support architecture refill message sent from the telecommunications support architecture to the prepaid service usage system.

3. The architecture of claim 1, where the messaging interface further comprises:
   a subscriber account interface from the telecommunications support architecture to the prepaid rating system.

4. The architecture of claim 3, where the subscriber account interface comprises:
   a 'Create Customer' message definition for a telecommunications support architecture customer creation message sent from the telecommunications support architecture to the prepaid service usage system; and
   a 'Create Account' message definition for a telecommunications support architecture account creation message sent from the telecommunications support architecture to the prepaid service usage system.

5. The architecture of claim 4, where the subscriber account interface further comprises:
   a 'Modify Customer' message definition for a telecommunications support architecture customer modify message sent from the telecommunications support architecture to the prepaid service usage system; and
   a 'Modify Account' message definition for a telecommunications support architecture account modify message sent from the telecommunications support architecture to the prepaid service usage system.

6. The architecture of claim 1, where the messaging interface further comprises: a balance adjustment interface from the telecommunications support architecture to the prepaid rating system.

7. The architecture of claim 6, where the balance adjustment interface comprises a balance adjustment message definition for a telecommunications support architecture balance adjustment message sent from the telecommunications support architecture to the prepaid service usage system.

8. The architecture of claim 1, where the multiple event type definitions comprise:
   a voice traffic event type definition; and a short message service event type definition.

9. The architecture of claim 1, where the multiple event type definitions comprise:
   an Internet traffic event type definition.

10. The architecture of claim 1, where the multiple event type definitions comprise:
    a voice over Internet protocol event type definition; and
    an Internet protocol television event type definition.

11. The architecture of claim 1, wherein the format used by the telecommunication support architecture includes extensible markup language (XML), and wherein the format used by the prepaid architecture includes extensible stylesheet language for transformations (XSLT) stylesheets.

12. A method for establishing a telecommunications system architecture, the method comprising:
    providing a telecommunications support architecture comprising prepaid rating balances and post-paid account balances for service customers;
    providing a prepaid architecture that tracks service usage for a prepaid service;
    establishing a bi-directional messaging interface connecting the telecommunications support architecture and the prepaid architecture;
    establishing a subscriber account interface from the telecommunications support architecture to the prepaid architecture, the subscriber account interface including a subscriber account message adapter;
    mapping, using the subscriber account message adapter, from a telecommunications support architecture subscriber account message to a prepaid architecture subscriber account message, comprising transforming a format used by the telecommunications support architecture to a second, different format used by the prepaid architecture; and
    establishing a service usage interface from the prepaid architecture to the telecommunications support architecture, and further establishing in the service usage interface:
       a service use event record having an event header;
       a dynamically configurable event attribute list; and
       multiple event type definitions, each including an event attribute definition which specifies event attributes configured to be inserted into the dynamically configurable event attribute list in the service use event record.

13. The method of claim 12, where establishing the subscriber account interface comprises:
    establishing a subscriber account message definition for the telecommunications support architecture subscriber account message sent from the telecommunications support architecture to the prepaid service usage system.

14. The method of claim 13, where establishing a subscriber account message definition comprises:
    establishing a 'Create Customer' message definition for a telecommunications support architecture customer creation message sent from the telecommunications support architecture to the prepaid service usage system; and establishing a 'Create Account' message definition for a telecommunications support architecture account creation message sent from the telecommunications support architecture to the prepaid service usage system.

15. The method of claim 13, where establishing a subscriber account message definition comprises:

establishing a 'Modify Customer' message definition for a telecommunications support architecture customer modify message sent from the telecommunications support architecture to the prepaid service usage system; and establishing a 'Modify Account' message definition for a telecommunications support architecture account modify message sent from the telecommunications support architecture to the prepaid service usage system.

16. The method of claim 12, where establishing the messaging interface further comprises:

establishing a balance adjustment interface from the telecommunications support architecture to the prepaid rating system.

17. The method of claim 12, where establishing the messaging interface further comprises:

establishing a prepaid account refill interface from the telecommunications support architecture to the prepaid rating system.

18. The method of claim 12, where establishing the multiple event type definitions comprises:

establishing a voice traffic event type definition.

19. The method of claim 12, where establishing the multiple event type definitions comprises:

establishing an Internet traffic event type definition.

20. The method of claim 12, where establishing the multiple event type definitions comprises:

establishing a short message service event type definition.

21. The method of claim 12, wherein the format used by the telecommunication support architecture includes extensible markup language (XML), and wherein the format used by the prepaid architecture includes web service definition language (WSDL) or extensible schema diagram (XSD).

* * * * *